(12) United States Patent  
Hsia

(10) Patent No.: US 7,654,103 B2  
(45) Date of Patent: Feb. 2, 2010

(54) METHODS AND MEANS TO COLLECT WATER VAPORS

(76) Inventor: Chih-Yu Hsia, 301 Warren Way, Arcadia, CA (US) 91007

( * ) Notice: Subject to any disclaimer, the term of this patent is extended or adjusted under 35 U.S.C. 154(b) by 720 days.

(21) Appl. No.: 11/256,749

(22) Filed: Oct. 24, 2005

(65) Prior Publication Data

US 2007/0090202 A1    Apr. 26, 2007

(51) Int. Cl.
*F25D 21/14*    (2006.01)
*B01D 3/00*    (2006.01)

(52) U.S. Cl. ............................ 62/285; 202/176; 202/83; 202/234

(58) Field of Classification Search ...................... 62/93, 62/128, 283, 285, 202, 203, 239; 203/10, 203/90, DIG. 1; 202/234; 159/48.1, 903, 159/904
See application file for complete search history.

(56) References Cited

U.S. PATENT DOCUMENTS 3,282,327 A  * 11/1966 Hardy et al. ................ 159/47.1
3,367,843 A  *  2/1968 Clive et al. ................... 202/176
3,408,260 A  * 10/1968 Feldman et al. ............... 202/83
3,415,719 A  * 12/1968 Telkes .......................... 202/83
2002/0092761 A1* 7/2002 Nagler ........................ 202/234

* cited by examiner

*Primary Examiner*—Frantz F Jules
*Assistant Examiner*—Cassey Bauer
(74) *Attorney, Agent, or Firm*—William W. Haefliger

(57) ABSTRACT

To collect freshwater from water using a freshwater collection system which comprises of a vapor collector field formed by vapor collectors which have floatable platforms with central holes, curved roofs which each spans over each central holes and which allow sun rays to penetrate through, channels each with a nipple, "U"-shaped vacuum breaker tubes, and many eyes; a floatable water sprinkling system which has a relatively stationary platform which has eyes and which encircles a sprinkler platform which has a pump with a screen at one end and at the other end with a pipe which connects with a sprinkler head, a fuel supply system and an internal combustion engine with gear system which drives the pump; and a freshwater collector relay which is an enclosed container with a one-way valve, a weight, a nipple near the weight, many eyes, and many nipples near the eyes and the one-way valve.

20 Claims, 24 Drawing Sheets

METHODS AND MEANS TO COLLECT WATER VAPORS

BACKGROUND OF THE INVENTION

1. Field of the Invention

This invention relates to means and methods to collect water vapors evaporated from a water surface.

2. Descriptions of the Prior Arts

No prior art related to methods and means to directly collect water vapors from a water surface was found.

SUMMARY OF THE INVENTION

To obtain freshwater from seawater or the like can be done by reverse osmoses, and/or micro-filtration processes. Evaporation and condensation processes in distillation towers are also used to extract freshwater from seawater or the like. However, these processes take much energy and equipment. They produce relatively very expensive freshwaters. Therefore, methods and means to produce relatively inexpensive freshwaters are sought.

The invented methods and means provide devices to collect water vapors evaporated from water surface, to condense water vapors to become freshwater, and to convey and collect the freshwater. The invented methods and means also provide devices to increase water evaporation rates. The invented methods and means also provide ways to increase water vapor condensation rates.

These and other objects and advantages of the invention, as well as the details of illustrative embodiments, will be more fully understood from the following specification and drawings, in which:

DRAWING DESCRIPTION

GENERAL DESCRIPTION

Referring to FIGS. 1 through 7, a vapor collector 21, which can float on a water surface, consists of an upper body 22 and a lower body 23.

Figure 1:
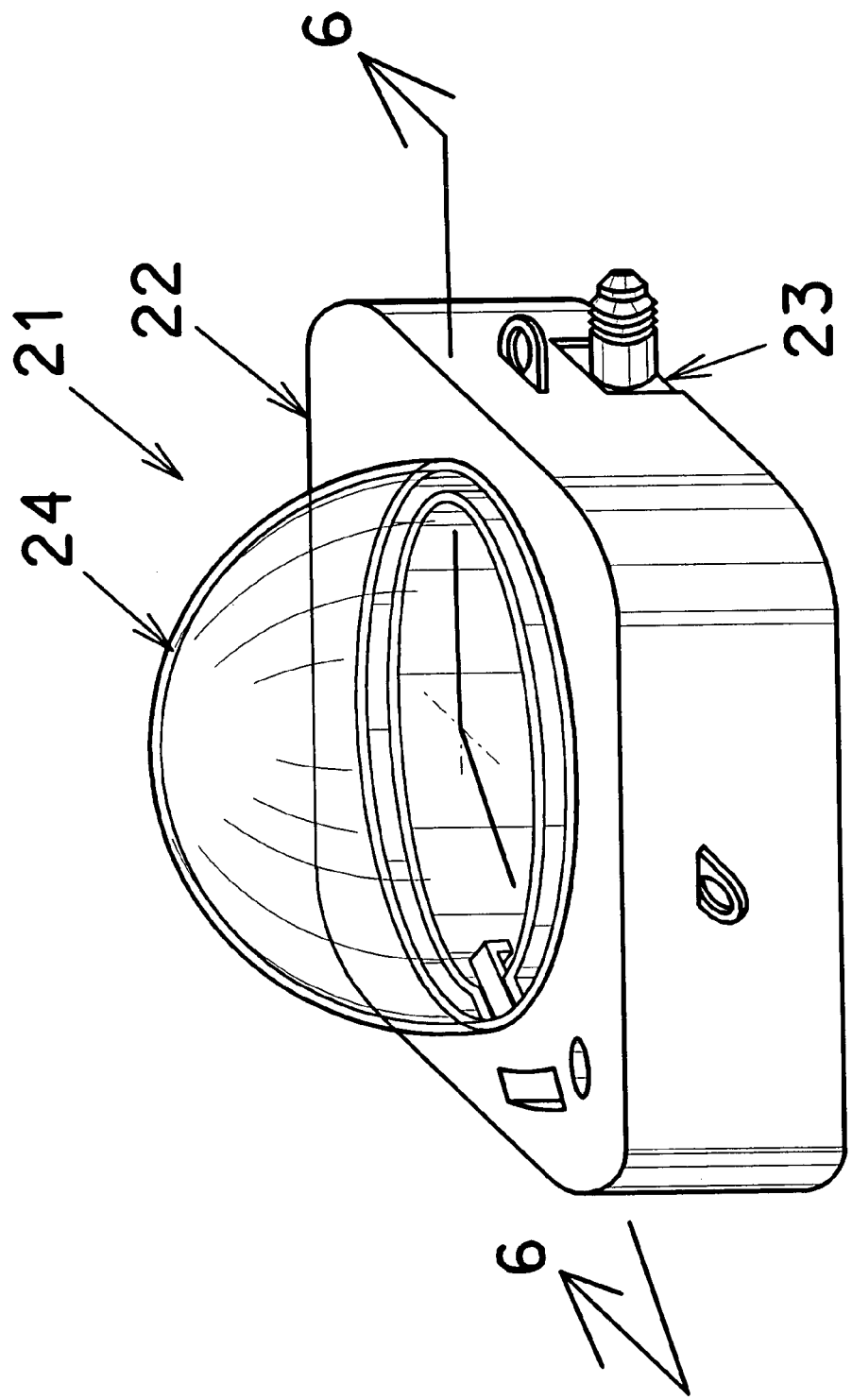
FIG. 1 is an isometric view of a water vapor collector of the invented devices.
Figure 2:
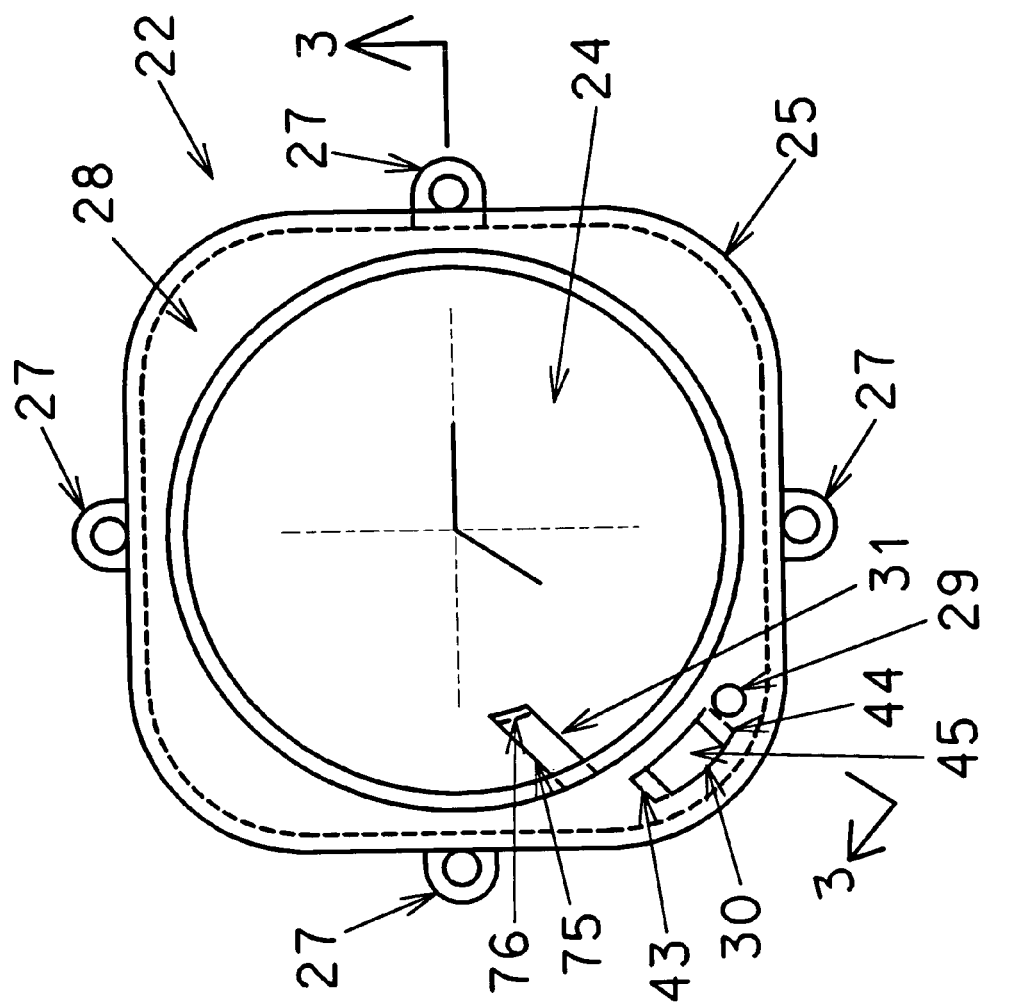
FIG. 2 is a top view of an upper body of the invented water vapor collector.
Figure 3:
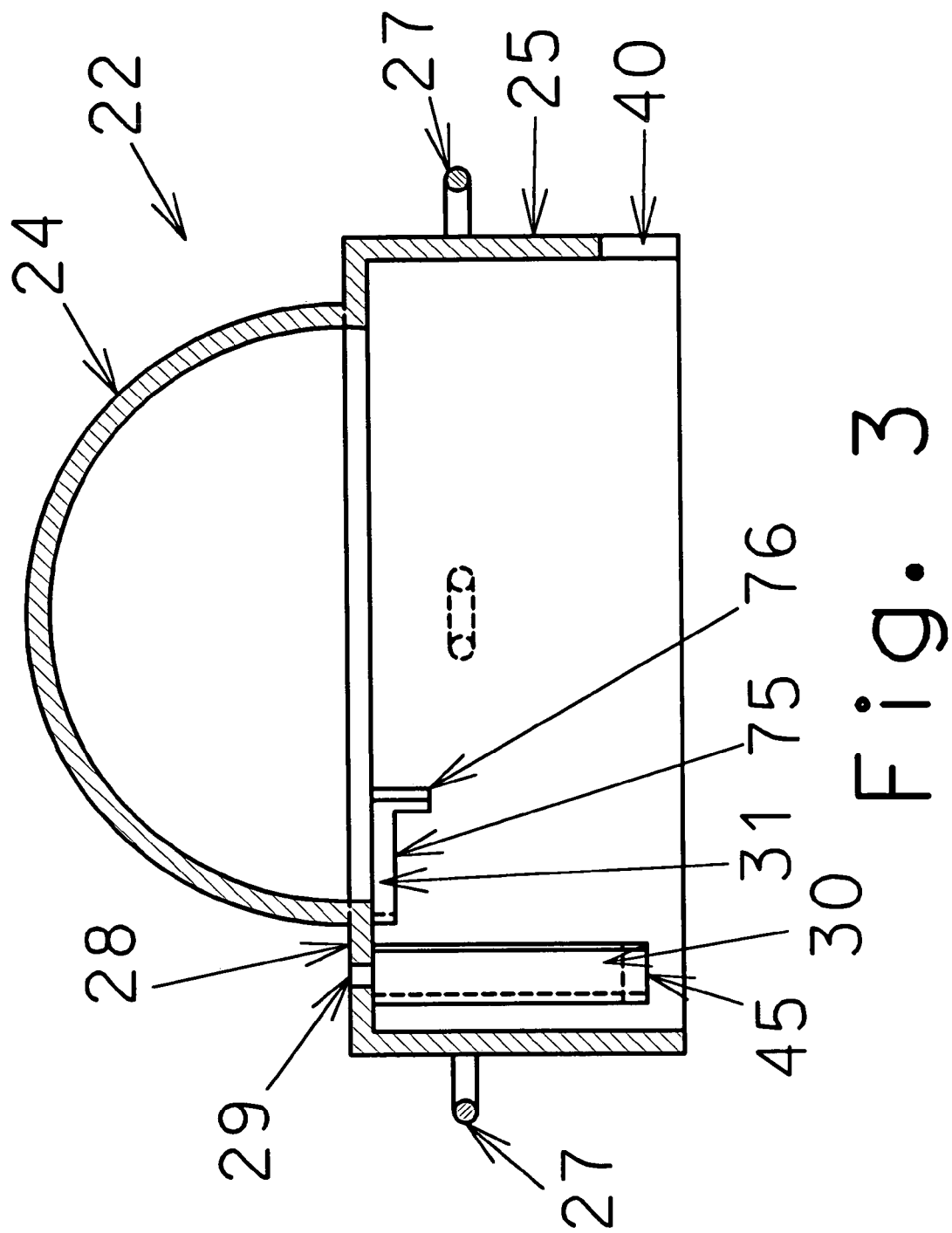
FIG. 3 is a sectional view of an upper body of the invented water vapor collector.

Referring to FIGS. 2 and 3, the upper body 22 has a transparent dome 24 that is supported by a wall, the dome support wall 25, and a surface, the top surface 28. A number of eyes, the eye for link rod 27, are on the exterior surface of the dome support wall. A vacuum breaker part A, 30, which has a side plate 43, a side plate 44 and a bottom plate 45, extrudes from the bottom surface of the top surface 28. A vacuum breaker part B, 31, which has a level plate 75 and a vertical end plate 76, connects to the bottom surface of the top surface 28. A hole, the air vent hole 29, is on the top surface 28. A recessed area, the wall break 40, is below one of the eye for link rod 27 and is on the rim of the dome support wall 25.

Figure 4:
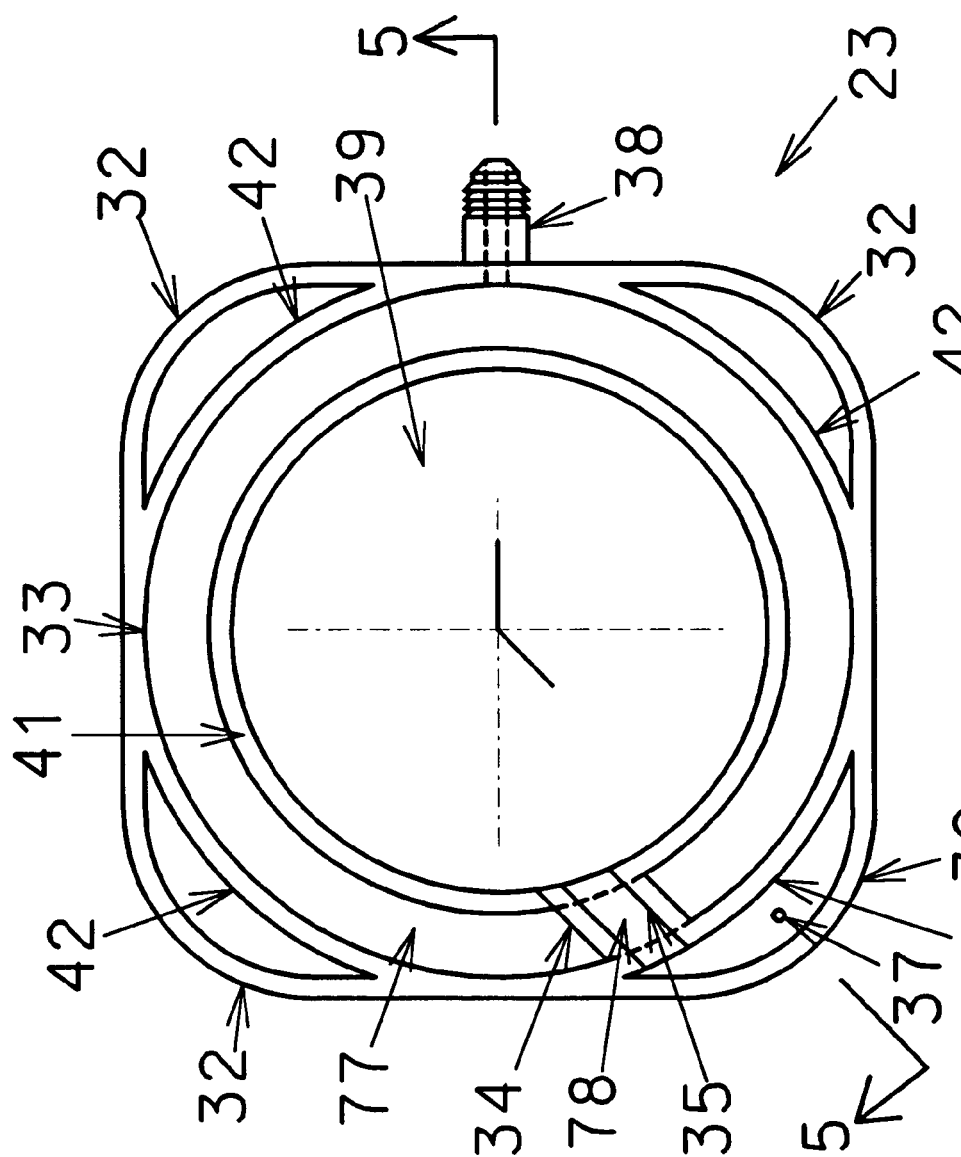
FIG. 4 is a top view of a lower body of the invented water vapor collector.
Figure 5:
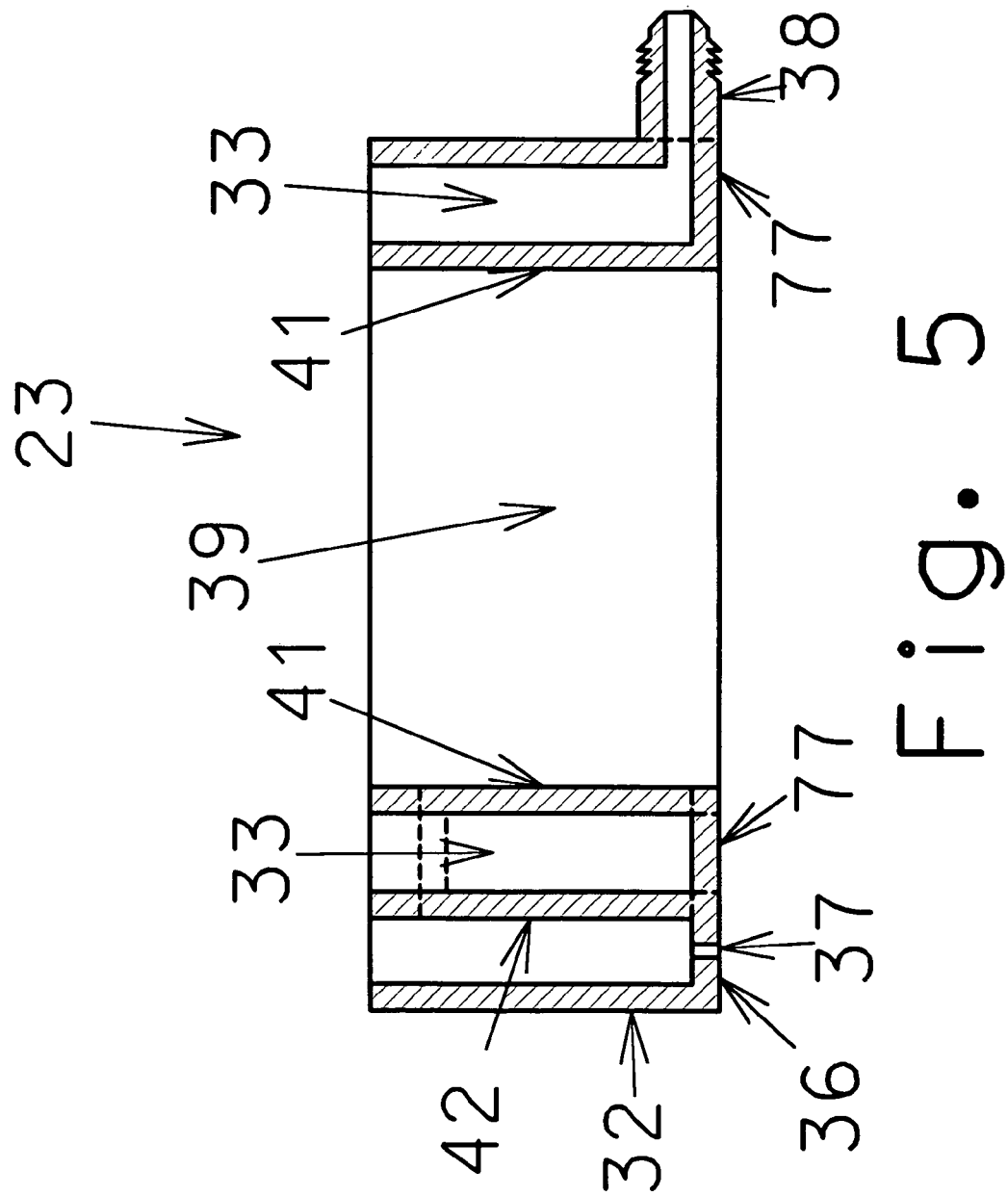
FIG. 5 is a sectional view of a lower body of the invented water vapor collector.
Figure 6:
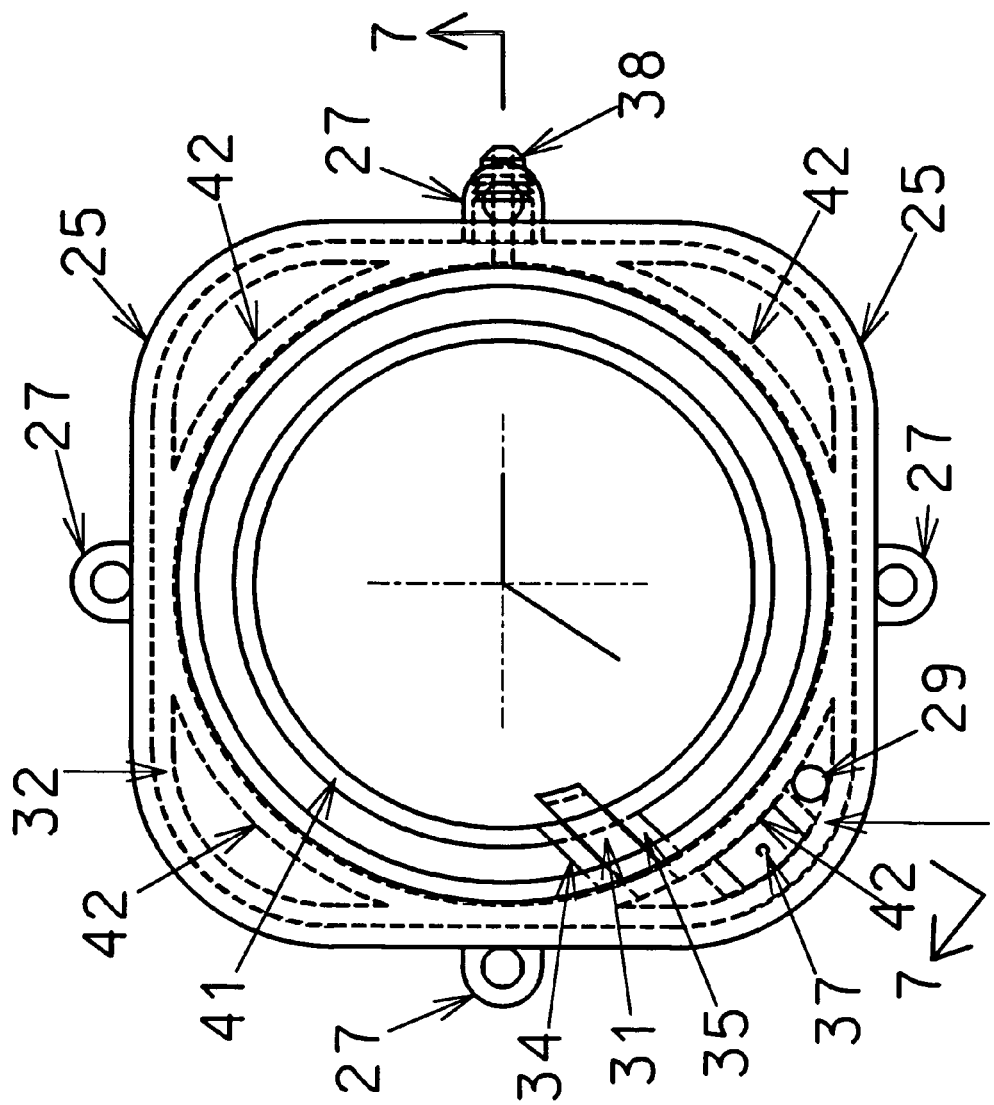
FIG. 6 is a top view of an entire embodiment of the invented water vapor collector.
Figure 7:
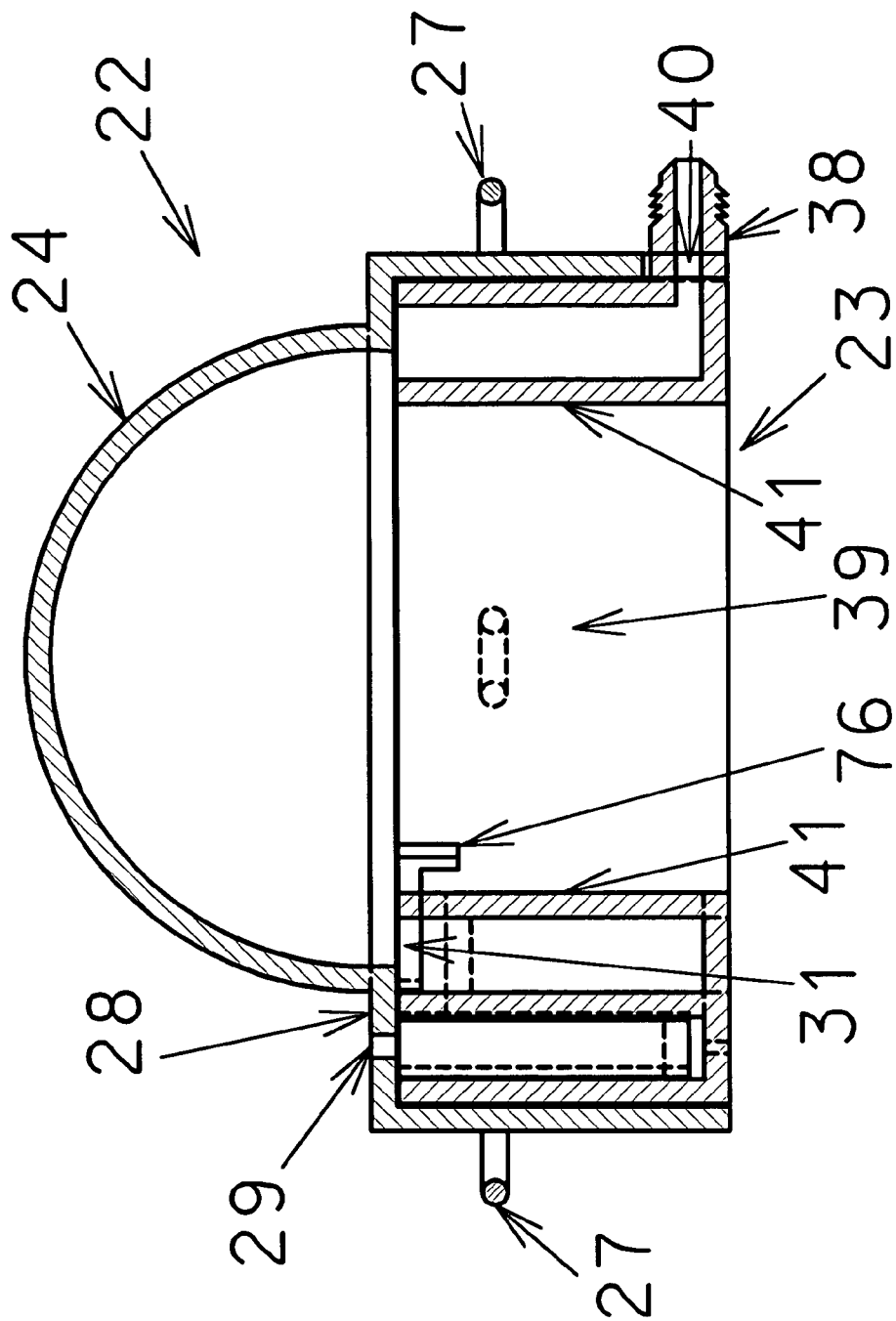
FIG. 7 is a sectional view of the invented water vapor collector shown in FIG. 6.

Referring to FIGS. 4 and 5, the lower body 23 has a freshwater collector channel 33 and a wall 32 which can engage with the dome support wall 25 of the upper body 22. Inside and at some locations of the wall 32 is the channel outer wall 42 of the freshwater collector channel 33. The channel outer wall 42, the channel inner wall 41, the channel bottom plate 77, the vacuum breaker side wall A, 34, and the vacuum breaker side wall B, 35, together form the freshwater collector channel 33. There is a short plate, the vacuum breaker bottom plate 78, connecting the two vacuum breaker side walls A and B. An opening 39 is in the interior side of the channel inner wall 41. A hole, the weep hole 37, is on the bottom plate 36 that connects the bottom edges of the wall 32 and the channel outer wall 42. A freshwater outlet connector 38, which is a nipple with optional concentric rings to facilitate the connection with a tube, extrudes from the channel outer wall 42 near the channel bottom plate 77.

To form a vapor collector 21, referring to FIGS. 1 through 7, a lower body 23 is engaged with the upper body 22 with the freshwater outlet connector 38 rests in the wall break 40. The vacuum breaker part B, 31, will be above the vacuum breaker bottom plate 78 and will be between the vacuum breaker side wall A, 34, and the vacuum breaker side wall B, 35. The vacuum breaker part A will be in a chamber surrounded by the wall 32, the channel outer wall 42 and the bottom plate 36 which has the weep hole 37. The wall 32, the channel outer wall 42, the bottom plate 36, the vacuum breaker bottom plate 78, the vacuum breaker side wall A, 34, the vacuum breaker side wall B, 35, the vacuum breaker part A, 30, the top surface 28 and the vacuum breaker part B, 31, will form a crooked generally "U"-shaped vacuum breaker tube. The tube will have the air vent hole 29 on one end and the gap between the end plate 76 and the surface of the channel inner wall 41 on the other end. The weep hole 37 will be on the invert of the generally "U"-shaped tube.

A vapor collector can float on the water surface because of the existences of the freshwater collector channel 33, the spaces between the wall 32, the bottom plate 36 and the channel outer wall 42, and possibly the material which makes them. A vapor collector can enclose a space bounded by the dome on the top, the inner wall of the freshwater collector channel on the sides, and the water surface on the bottom. The vacuum breaker tube can equalize somewhat the pressure differences between the enclosed space and the atmosphere outside the vapor collector.

Figure 8:
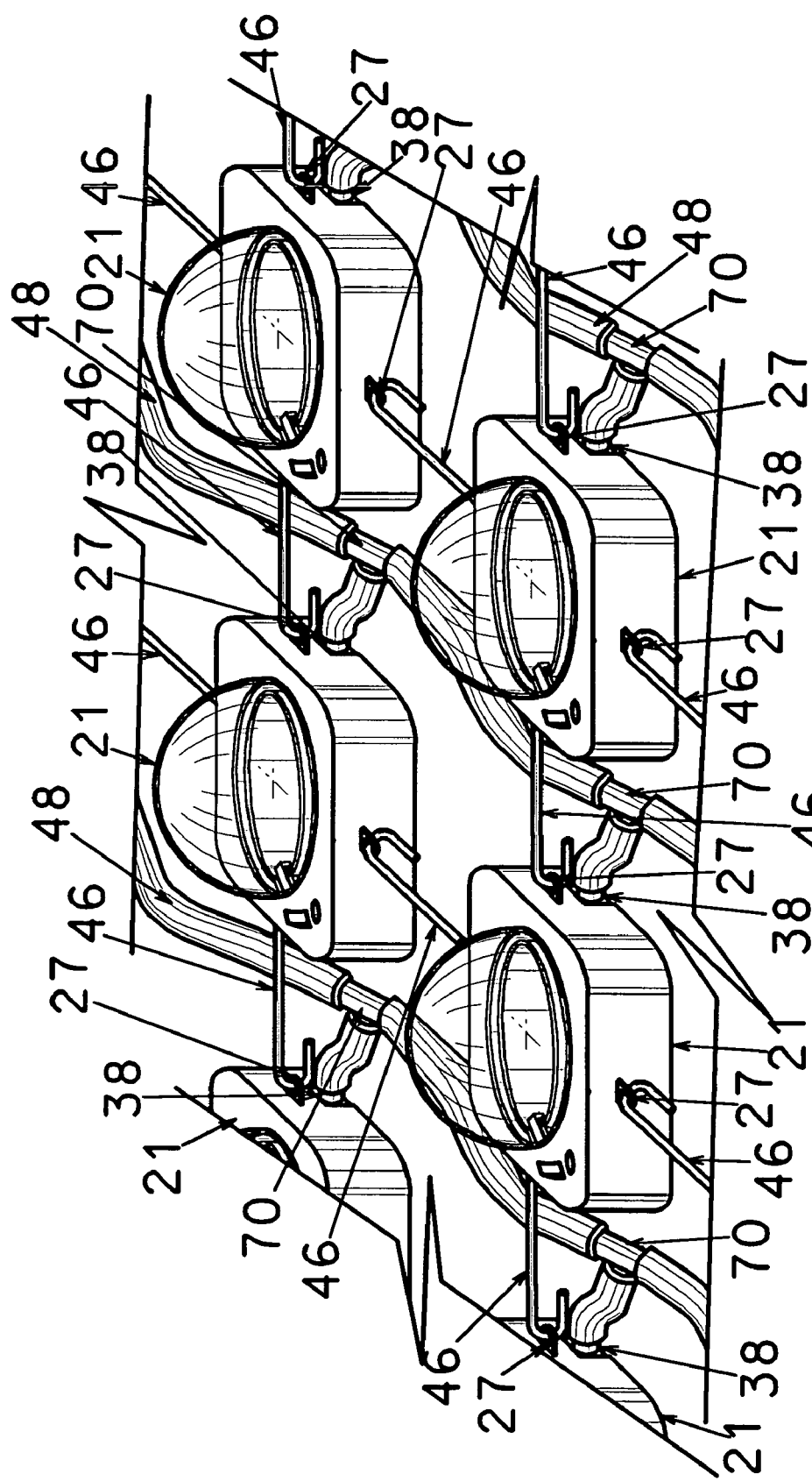
FIG. 8 is an isometric view of many of the invented water vapor collectors connected together.
Figure 9:
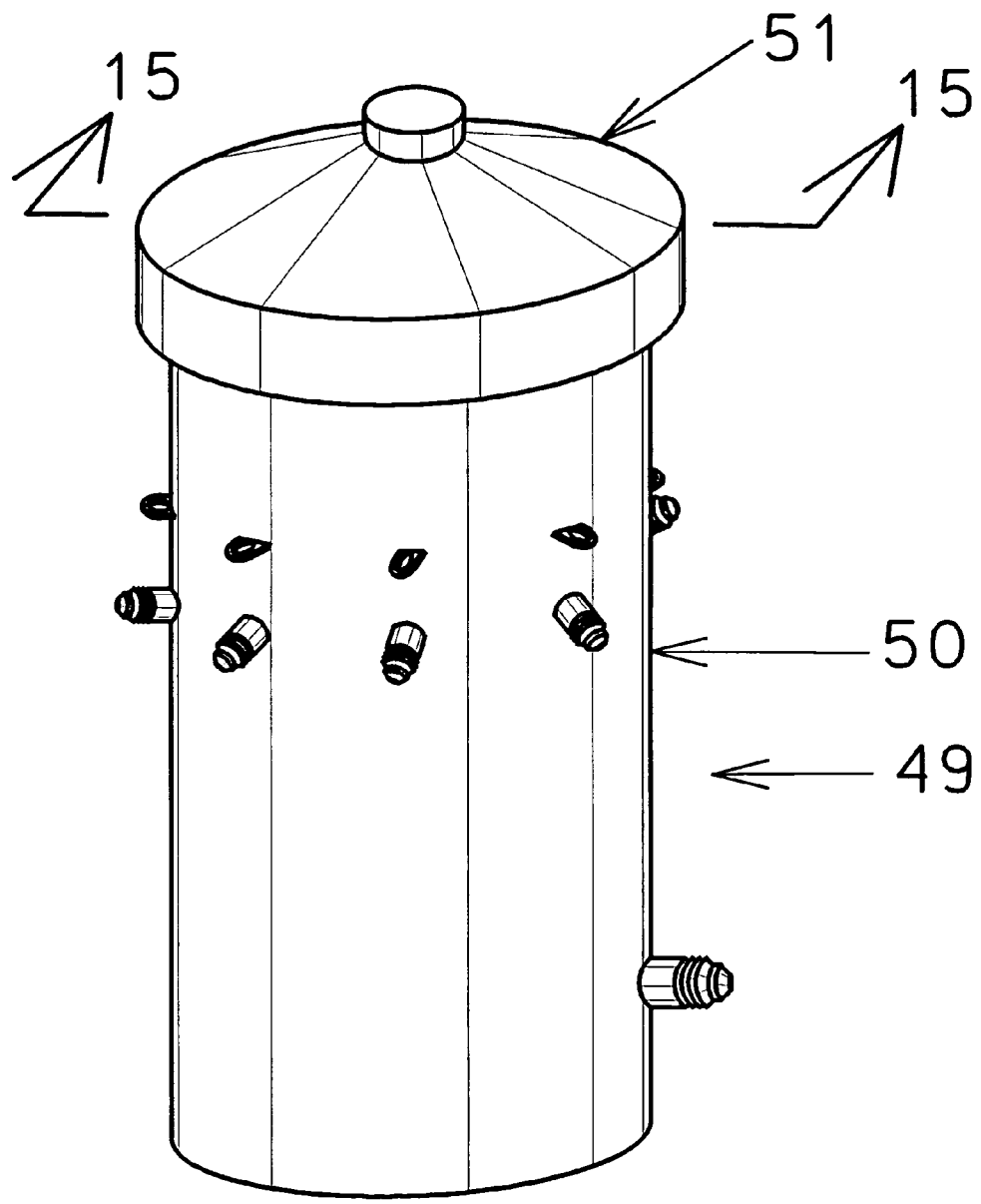
FIG. 9 is an isometric view of a freshwater collector relay of the invented devices.

Referring to FIG. 8, before using the invented devices, a link rod 46, which is a rod with a hook at each end, links two vapor collectors 21 together by linking through the eyes for link rod 27 of two adjacent vapor collectors. One end of a tube, the connecting tube, connects with the freshwater outlet connector 38 of a vapor collector. The other end of the connecting tube connects with a tube-connecting tee 70. A tube-connecting tee is a tee-shaped nipple that can connect three tubes to form a "T"-shaped joint. Another tube, the conveying tube 48, connects one tube-connecting tee to the other tube-connecting tee. In this way, many vapor collectors can be cross-lined together. The link rods will define the relative locations of the vapor collectors.

Referring to FIGS. 9 through 15, a freshwater collector relay 49 consists of a bottom portion 50 and a top portion 51.

Figure 10:
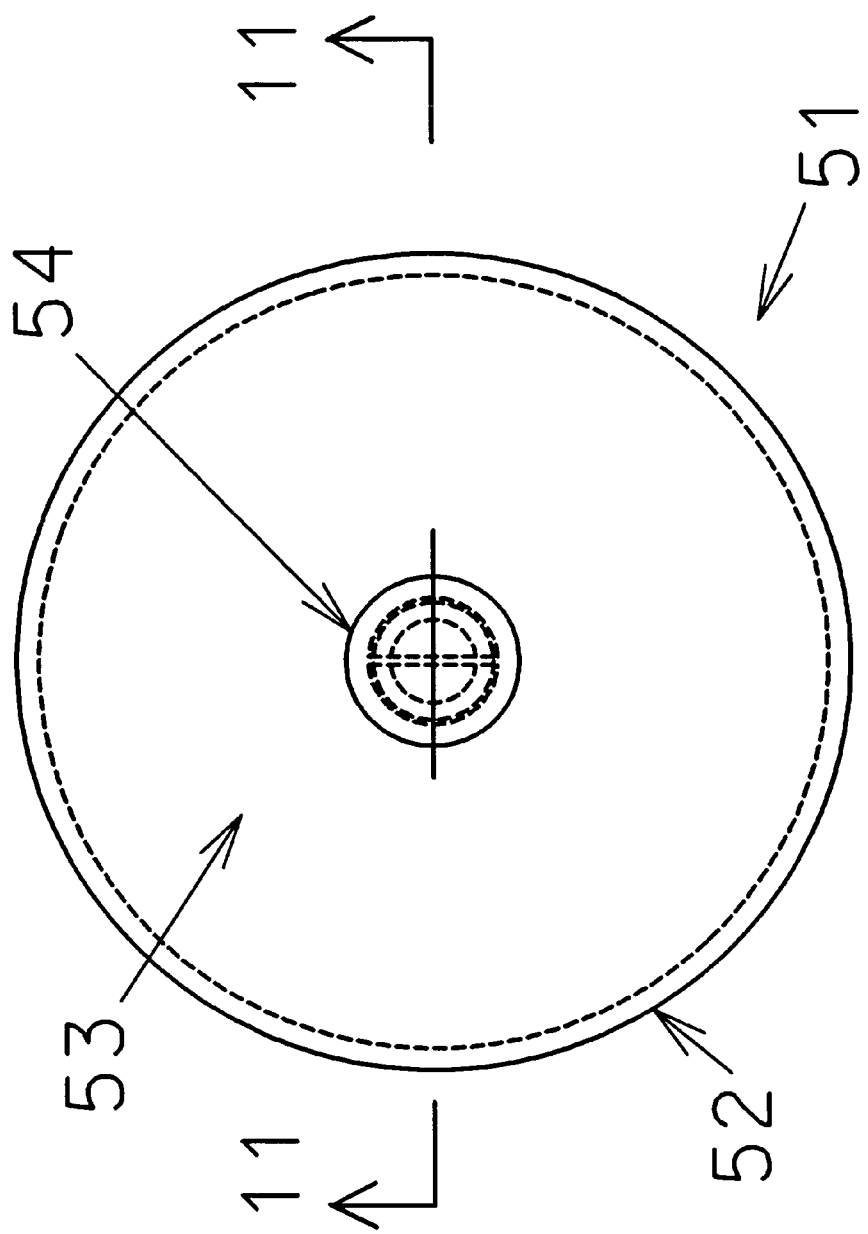
FIG. 10 is a top view of a top portion of the invented freshwater collector relay.
Figure 11:
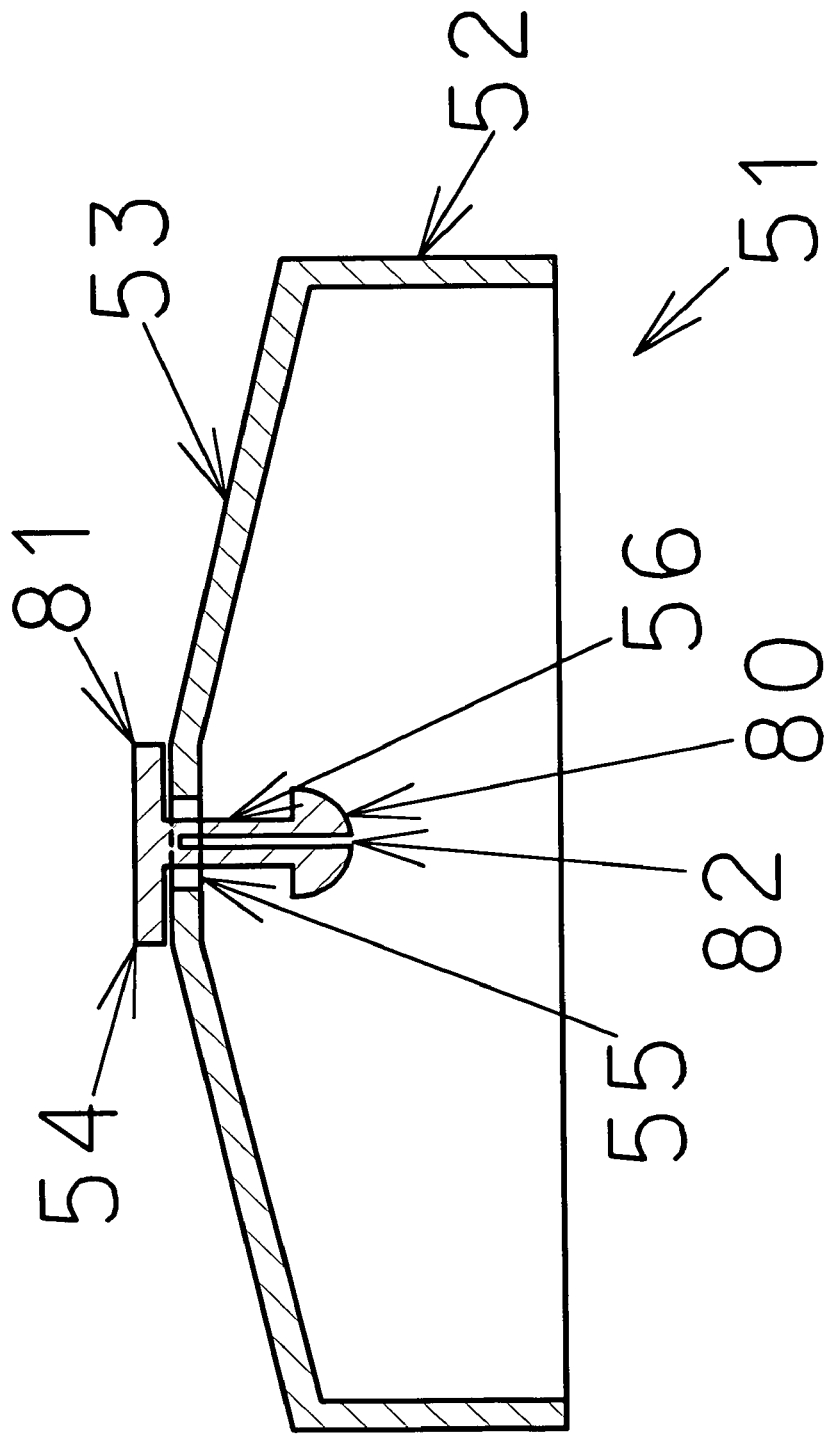
FIG. 11 is a sectional view of the top portion of the invented freshwater collector relay.

Referring to FIGS. 10 and 11, the top portion 51 of the freshwater collector relay basically is a cap with a side wall 52 and a generally cone-shaped top plate 53. A stem 56 and a head 80 of a movable plug, the vent plug 54, penetrates the hole 55 of the top plate 53 while the vent plug plate 81, a plate at the end of the vent plug 54, is on the top side of the top plate 53. The hole 55 is much bigger than the diameter of the stem 56 but slightly smaller than the diameter of the head 80. The hole 55 is much smaller than the diameter of the vent plug plate 81. A slot 82, which is in the middle of the head 80 and the stem 56, allows the head 80 to be pushed through the hole 55. The slight larger diameter of the head 80 than that of the hole 55 will prevent the vent plug 54 from detaching from the top plat 53 unintentionally. The vent plug 54 can move up and down along the hole 55. The vent plug plate is capable of closely contacting with the top plate 53.

Figure 12:
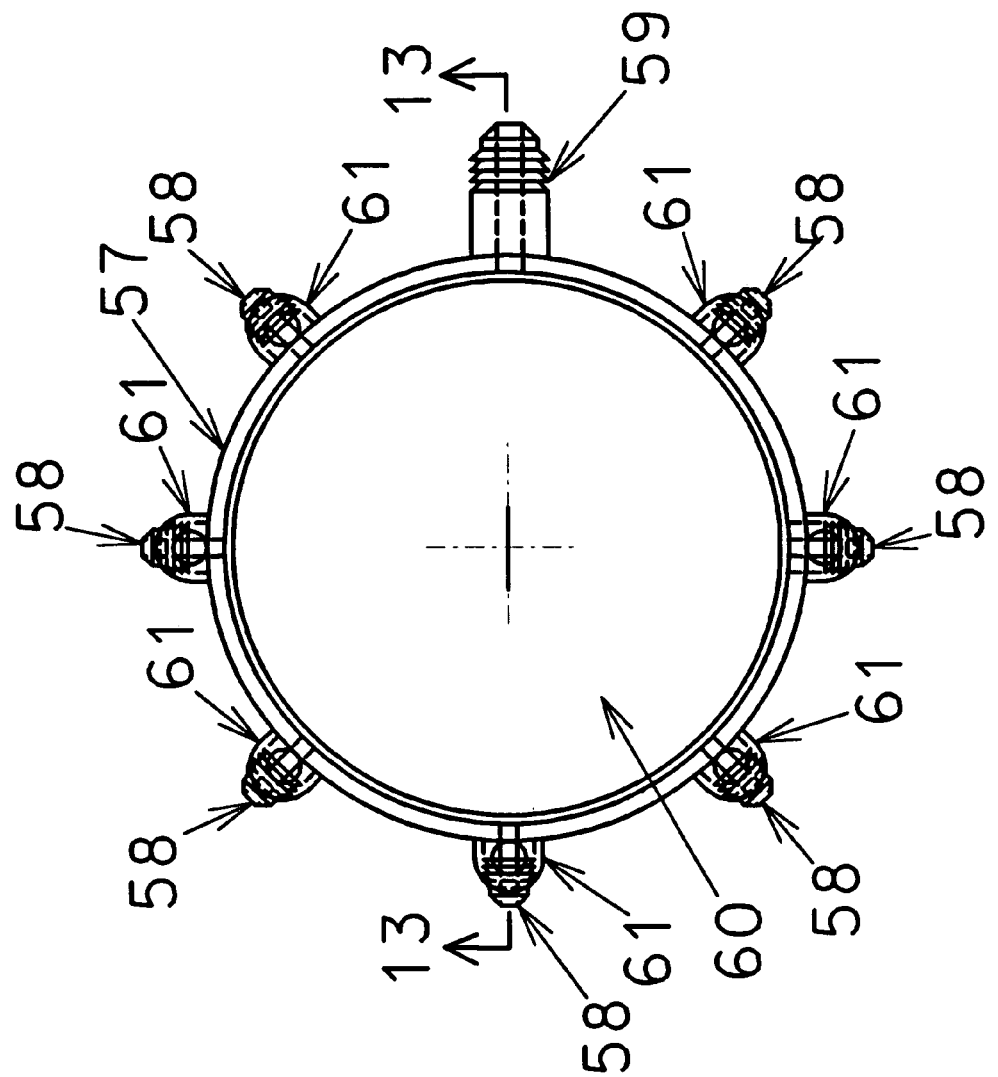
FIG. 12 is a top view of a bottom portion of the invented freshwater collector relay.
Figure 13:
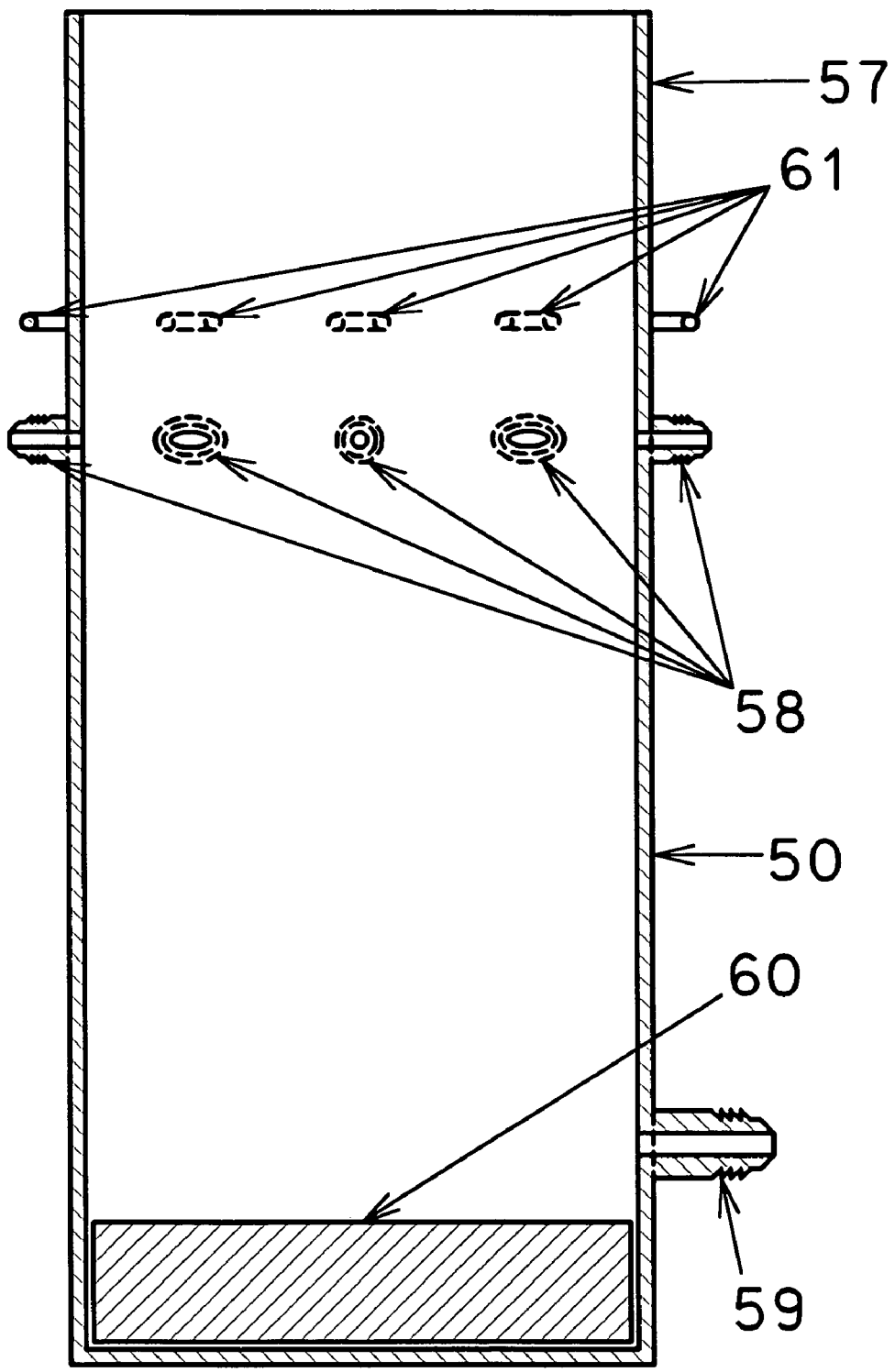
FIG. 13 is a sectional view of the bottom portion of the invented freshwater collector relay.

Referring to FIGS. 12 and 13, the bottom portion basically is a container 57 with an open end. On the exterior surface of the container there are many nipples, the freshwater inlet connector 58 and the freshwater outlet connector 59, which can be used for connections with tubes. There are many eyes, the eye for link rod 61, on the exterior surface of the container. The eye for link rod 61 and the freshwater inlet connector 58 are near the rim of the container while the freshwater outlet connector 59 is near the bottom of the container. A weight 60 is at the bottom of the container.

Figure 14:
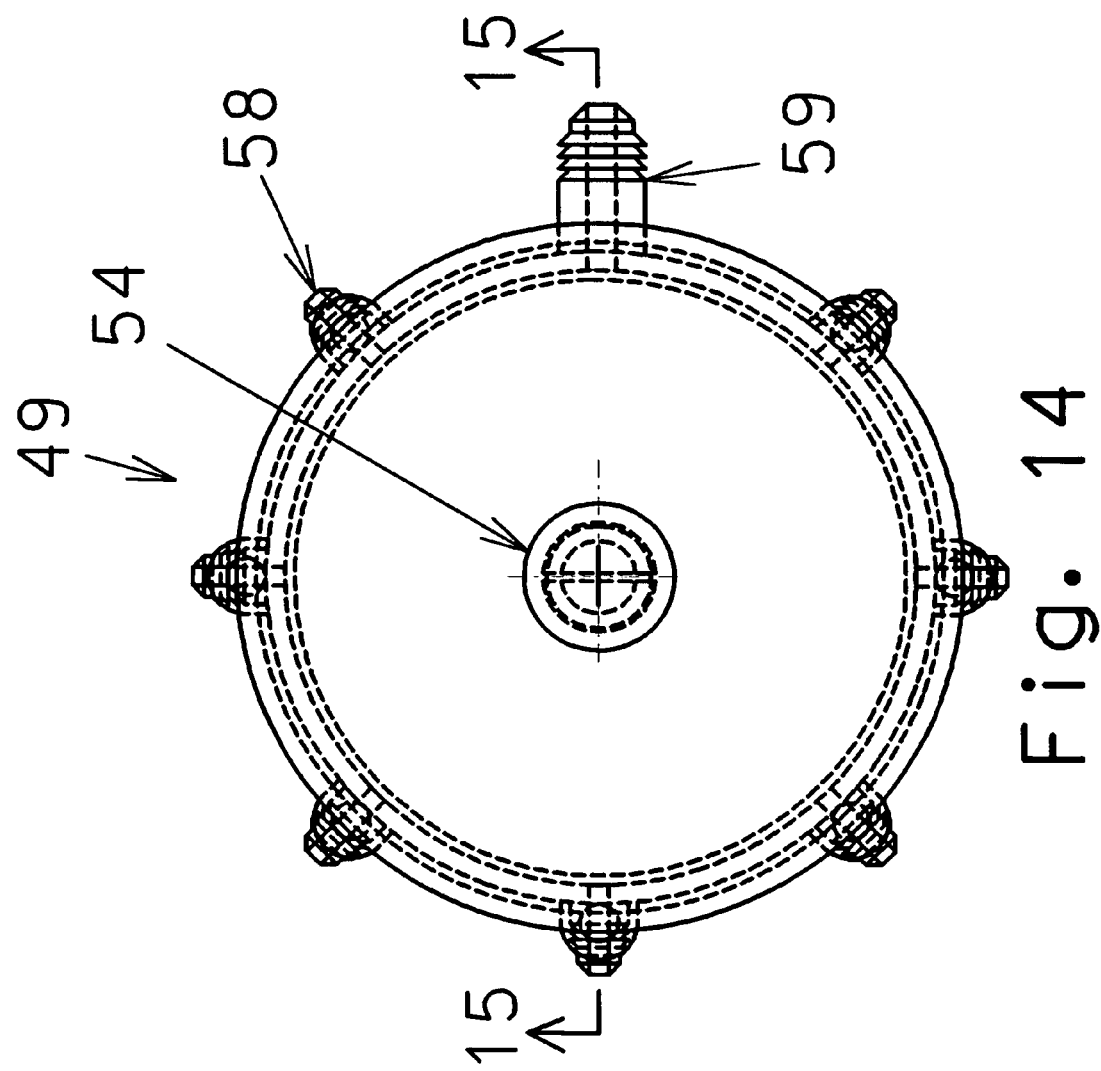
FIG. 14 is a top view of an entire embodiment of the invented freshwater collector relay.
Figure 15:
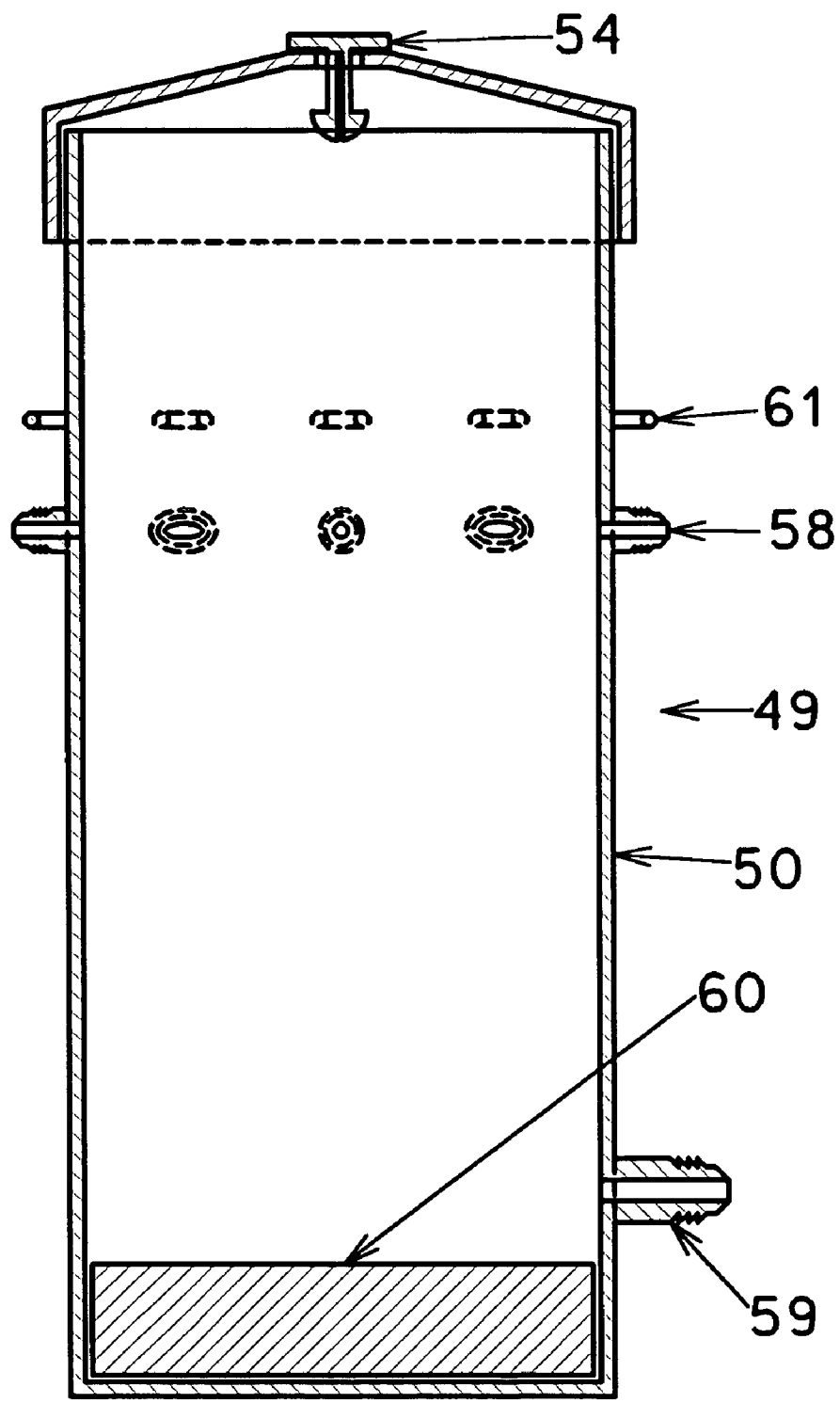
FIG. 15 is a sectional view of the entire embodiment of the invented freshwater collector relay.

Referring to FIGS. 14 and 15, the top portion 51 can be tightly put on the bottom portion 50 to form the freshwater collector relay 49.

Figure 16:
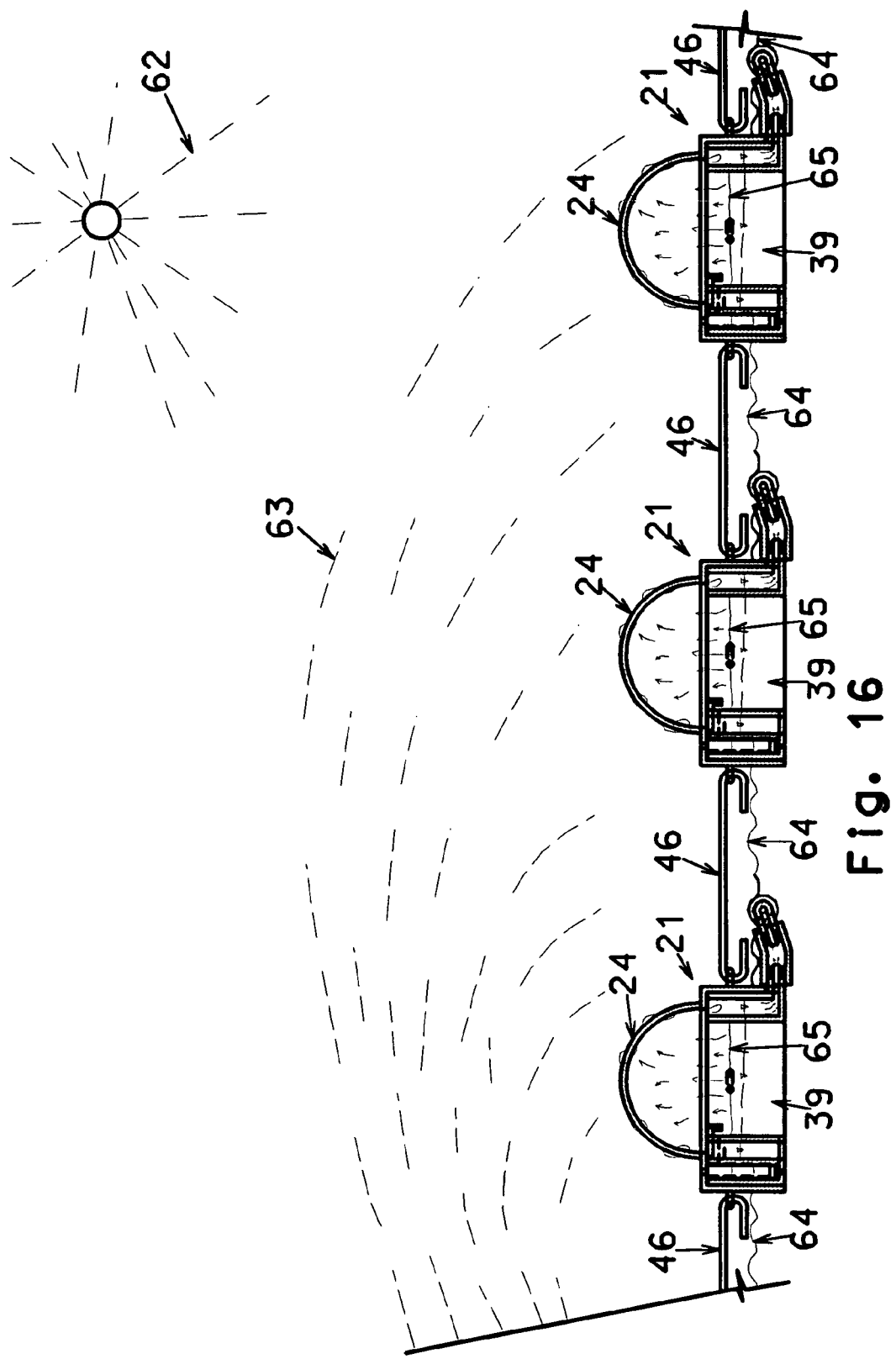
FIG. 16 is a sectional view of many of the invented water vapor collectors connected together and in use.
Figure 17:
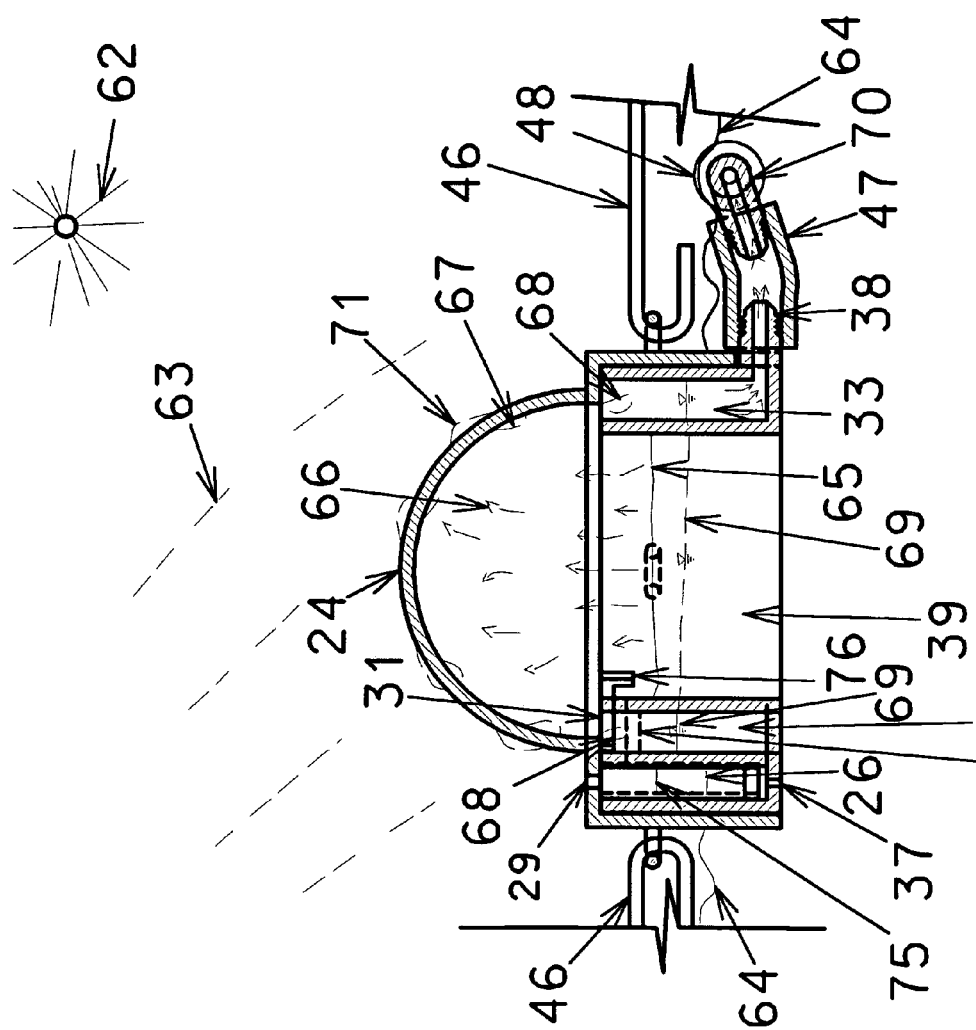
FIG. 17 is a sectional view that illustrates the uses of the invented water vapor collector.

Referring to FIGS. 8, 16 and 17, when using the invented devices, many of the inter-linked vapor collectors are put on the water surface 64 with the transparent domes 24 on top. The sunray 62 penetrates through the transparent domes and raises the water temperatures in the opening 39 of the vapor collectors. This will causes the evaporation processes of the water in the opening 39 of the vapor collectors. When the water vapor 66 reaches the relative cool interior surface of the transparent dome the water vapor condensation 67 will occur. Because of the dome surface, the water condenses will eventually form the freshwater drops 68 and fall into the freshwater collector channel 33. When certain amount of the freshwater is collected, the freshwater will enter and fill the connecting tube 47 and the conveying tube. When the freshwater level 69 in the collector channel is high, freshwater will be pushed out through the tubes to a sump in which freshwater will be collected.

To expedite the condensation processes of the water vapor, cool water can be sucked and pumped into sprinklers and spread periodically on the vapor collectors. When the sprinkled water 63 reaches the exterior surface of the transparent dome 24, some of the sprinkler-spread water 71 will momentarily stay on the dome surface and locally lower the dome's temperature. This will increase the condensation rate of the water vapor inside the dome.

To increase the evaporation rates of the water, a slightly vacuum pressure can be created inside the space bounded by the dome, freshwater collector channel 33 and the water level 65 in the opening 39. This slightly vacuum pressure can be created with the uses of the invented freshwater collector relay.

Figure 18:
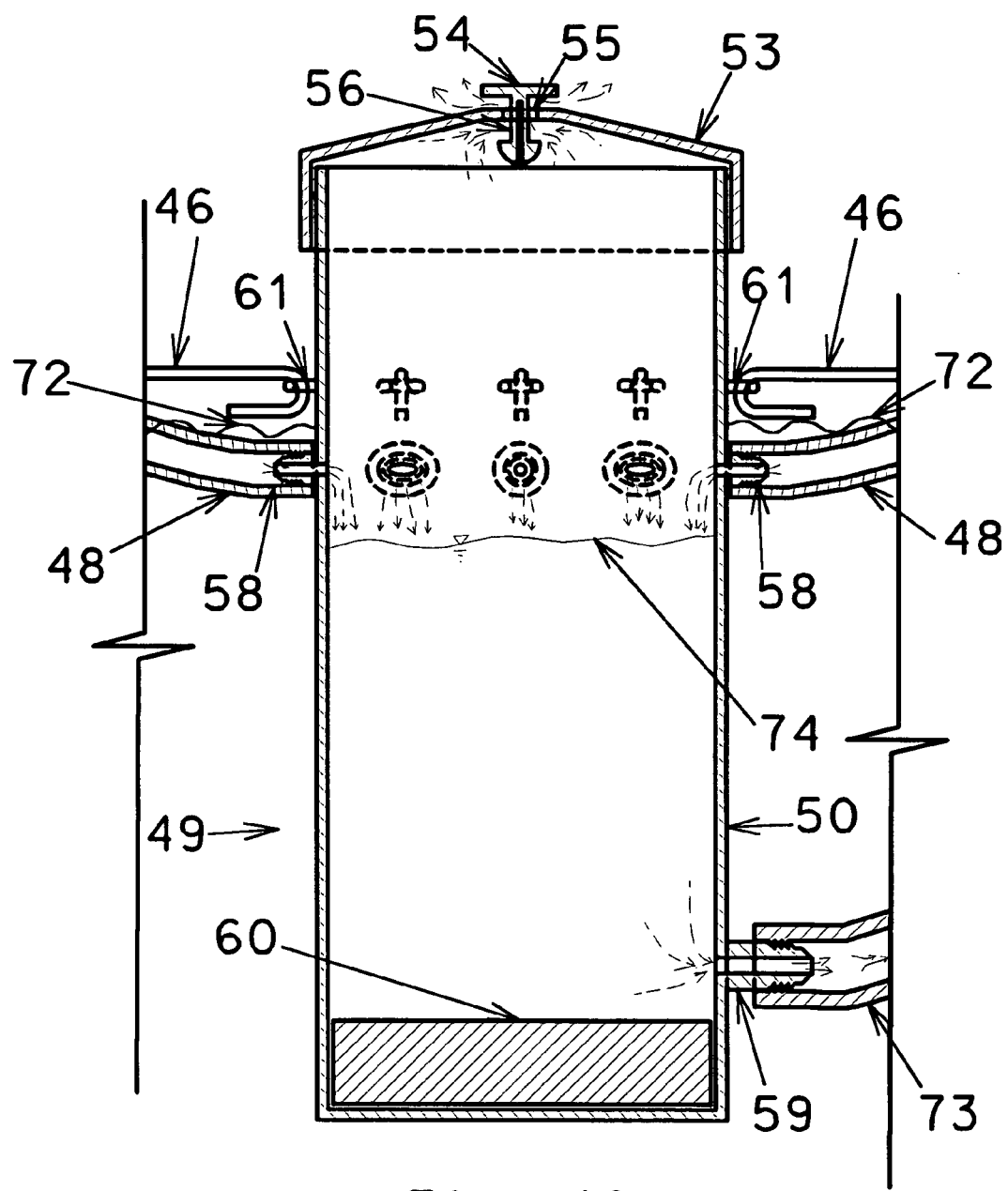
FIG. 18 is a sectional view that illustrates the uses of the freshwater collector relay.

Referring to FIG. 18, when using the freshwater collector relay 49, the end of the conveying tube 48 will be connected to the freshwater inlet connector 58. Through the eyes for link rod 61 the freshwater collector relay will be connected by the link rods 46 with other vapor collectors (not shown in FIG. 18). The freshwater outlet connector 59 will be connected with an outlet tube 73 which will be connected to either a pumping system or another freshwater collector relay which is much larger than the current one (neither the pumping system nor the another freshwater collector relay is shown in FIG. 18). Then the freshwater collector relay together with the aforementioned inter-linked vapor collectors will be put on the water surface. Freshwaters collected by the vapor collectors and conveyed in the conveying tube 48 will enter the freshwater collector relay. Because of the empty space in the freshwater collector relay, the buoyancy of the freshwater and possibly the material used to build it, the freshwater collector relay will float on top of the water surface 72. The freshwater collector relay will float approximately vertically on the water surface because of the weight 60 at the bottom of the freshwater collector relay. When the freshwater enters the freshwater collector relay, air inside will be compressed and the air pressure will increase. The increased air pressure will force the vent plug 54 to move upwards and air will be expelled from the freshwater collector relay through the annulus space between the hole 55 and the stem 56. The freshwater level 74 will rise and additional air will be expelled when additional freshwater enters into the freshwater collector relay. When freshwater is sucked out of the freshwater collector relay at the freshwater outlet connector 59, the freshwater level 74 will drop if the amount of the incoming freshwaters is less than that of the outgoing freshwater. Then, the air pressure in the freshwater collector relay will drop. The vent plug 54 then tends to close. When the vent plug is closed and no air can enter but the freshwater level 74 is kept on dropping, the freshwater level 74 will act like a piston in the freshwater collector relay to pull a slightly vacuum in the freshwater collector relay. This vacuum pressure can be transmitted through the freshwater in the tubes into the vapor collectors. The slightly vacuum pressures thus can be generated in the vapor collectors. The generally cone-shaped top plate will drain away any liquid on the top plate. Therefore, no liquid on the top plate will flow into the freshwater collector relay.

The generally "U"-shaped vacuum breaker tube will prevent too much vacuum pressure from being pulled inside a vapor collector. Referring to FIG. 17, when the vapor collector is in use, water will enter the vacuum breaker tube through the weep hole 37. The weep hole will be small so the flow rates of the water entering the vacuum breaker tube are small. Because the vacuum pressure in the vapor collector, the water surface 75 in the downstream leg (the leg next to the vacuum breaker part B) will be higher than the water surface 26 in the upstream leg of the generally "U"-shaped vacuum breaker tube. (The water surface 26 is shown for discussion purpose. It is actually on the backside of FIG. 17 and can not be seen in FIG. 17.) The lower the pressure inside the vapor collector is, the larger differences the water levels 75 and 26 are. When the vacuum inside the vapor collector becomes too strong, water in the vacuum breaker tube will be sucked into the vapor collector. Then air will be supplied through the air vent hole 29 into the upstream leg of the vacuum breaker tube. When air enters into the vapor collector, vacuum condition inside the vapor collector will be removed. The deflector 76 which deflects the water will ensure the water sucked out from the vacuum breaker tube not to be discharged into the freshwater collector channel. Water will slowly reenter the vacuum breaker tube to reseal and re-separate the interior of the vapor collector and its surrounding atmosphere. The vacuum condition inside the vapor collector can thus be recreated. With the vacuum breaker tube, no water will be sucked into the freshwater collector channel 33.

Figure 19:
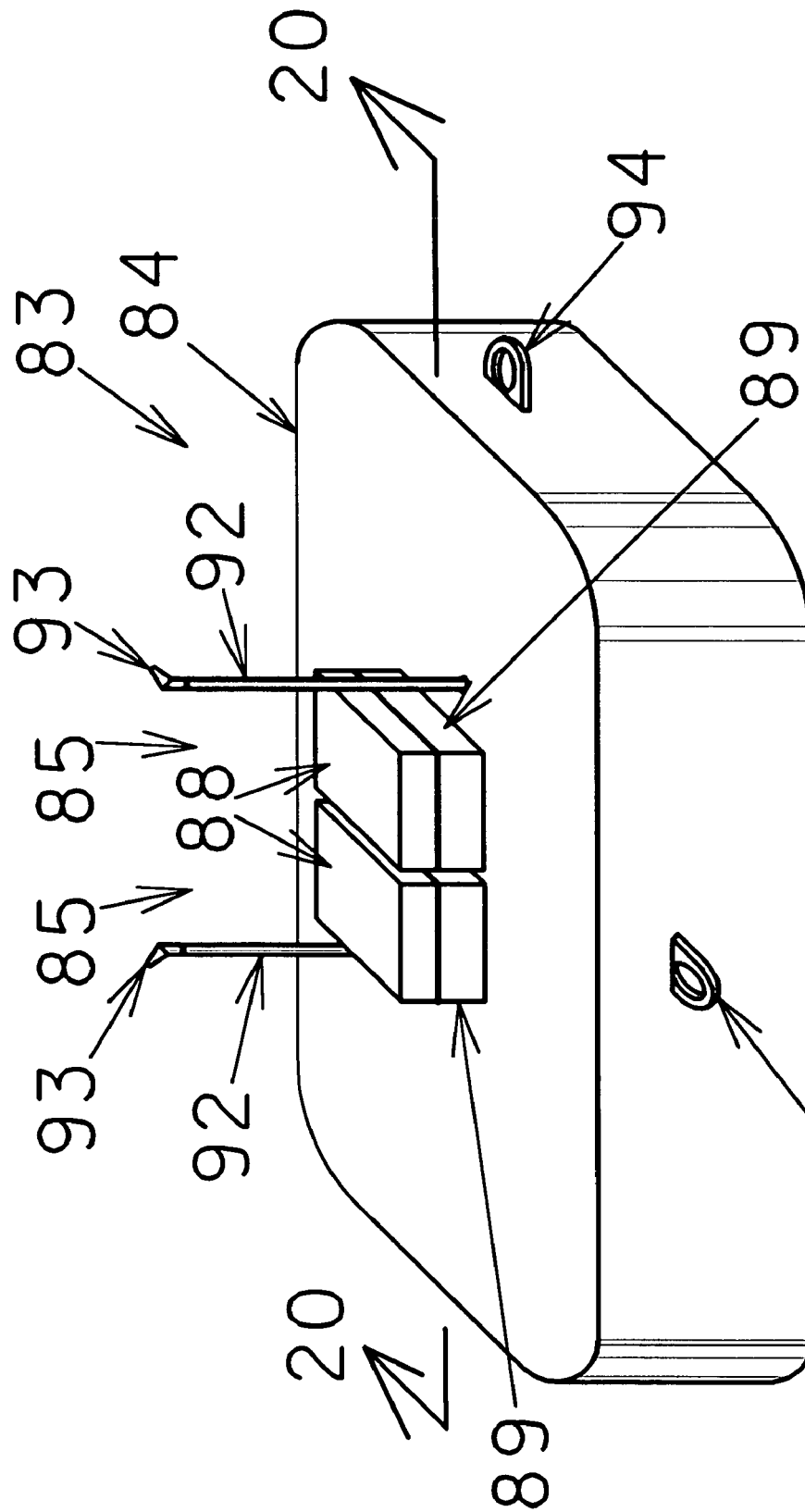
FIG. 19 is an isometric view of a water sprinkling system of the invented devices.
Figure 20:
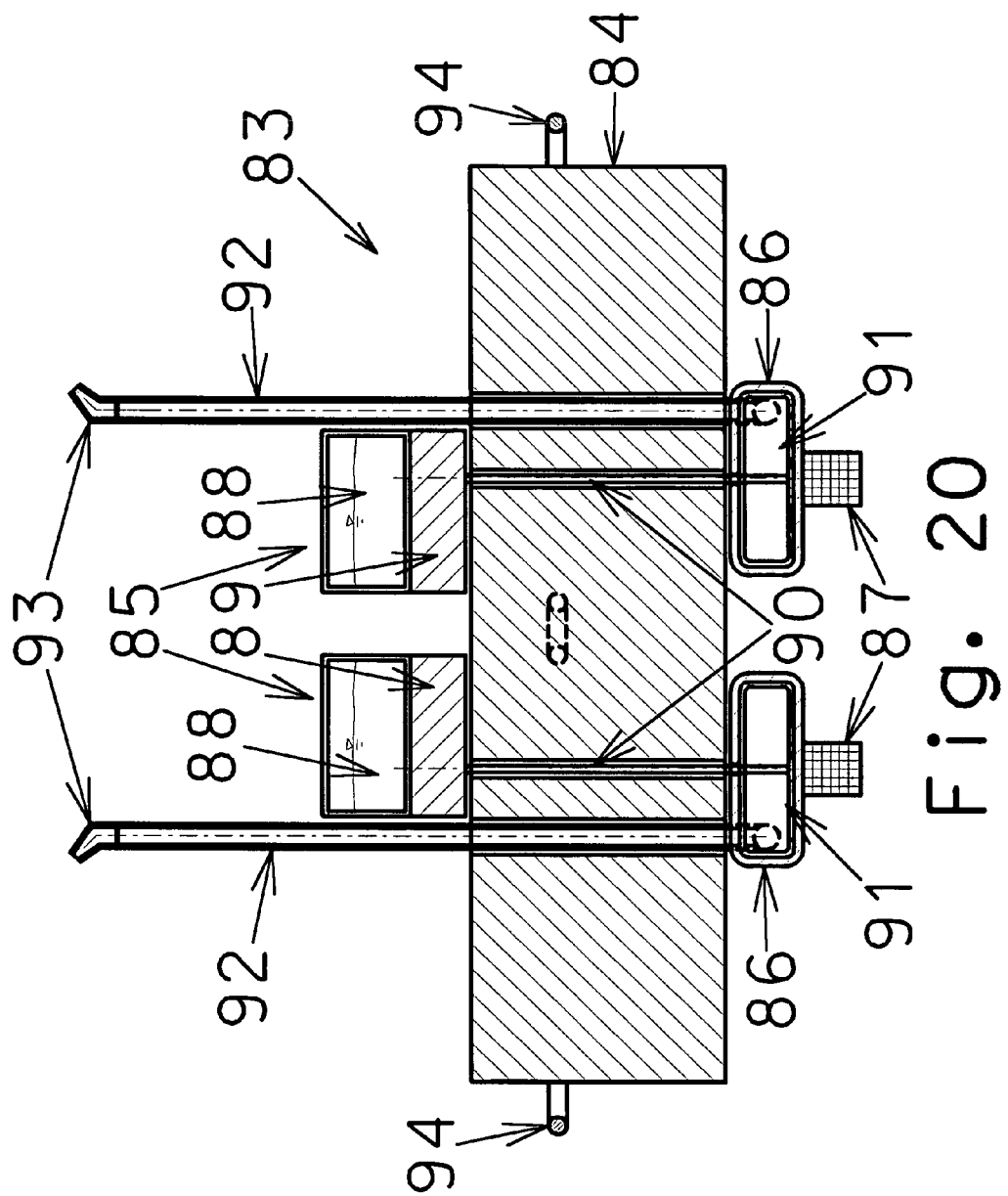
FIG. 20 is a sectional view of a water sprinkling system shown in FIG. 19.

Referring to FIGS. 19 and 20, a water sprinkler system 83 consists of a floatable platform 84 and two sprinkler units 85. Each of the sprinkler unit has a fuel tank 88 and other apparatus (not shown) which store and supply fuel and controls to operate an internal combustible engine 89 which turns a shaft 90 to drive a pump 86. There is a screen 87 on the suction side of the pump. A pipe 92 connects to the discharge side of the pump. A sprinkler head 93 is at the other end of the pipe. The sprinkler head can be turned by water that is discharged through the sprinkler head. The platform 84 has many eyes 94. The pumps are mounted on the under side of the platform 84 while the fuel tanks and the engines are on the topside. The sprinkler heads are above the engines. The two engines turn in opposite directions.

In using the water sprinkler system, both engines will be turned on. The impellers 91 of the pumps 86 will be turned and water will be sucked up through the screen. The screens will prevent fishes from being sucked into the pumps. The water will be discharged into the pipes then through the sprinkler heads into the air. Because the engines will be turning in different directions, the angular momentum generated by the pumps and engines will be naturalized and the platform will not spin on the water surface. Link rods, which are similar to aforementioned ones and which connect with the eyes 94 can link the water sprinkler system with the vapor collectors so that their relative locations will be the same.

Figure 21:
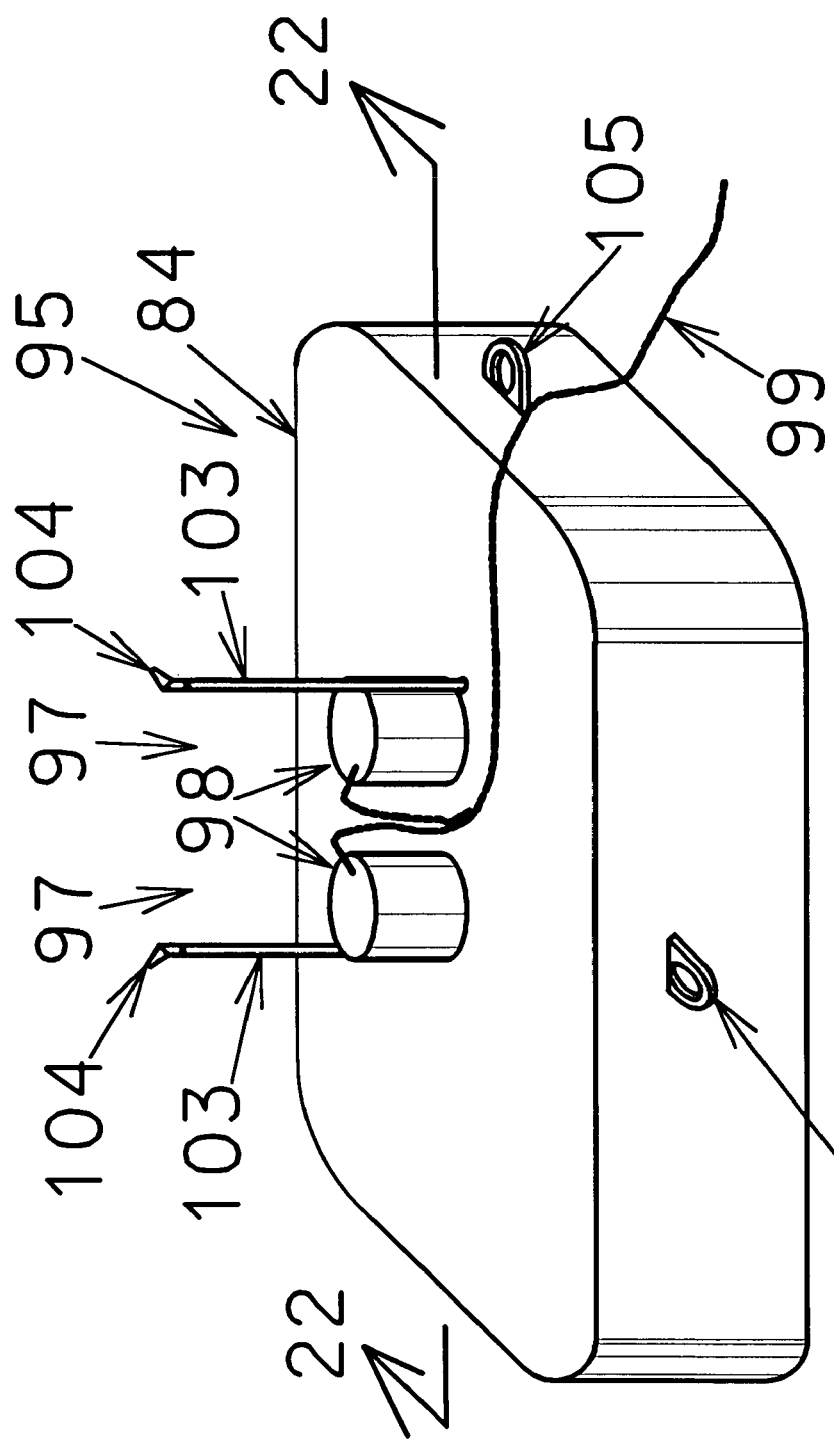
FIG. 21 is an isometric view of a variation of the water sprinkling system of the invented devices.
Figure 22:
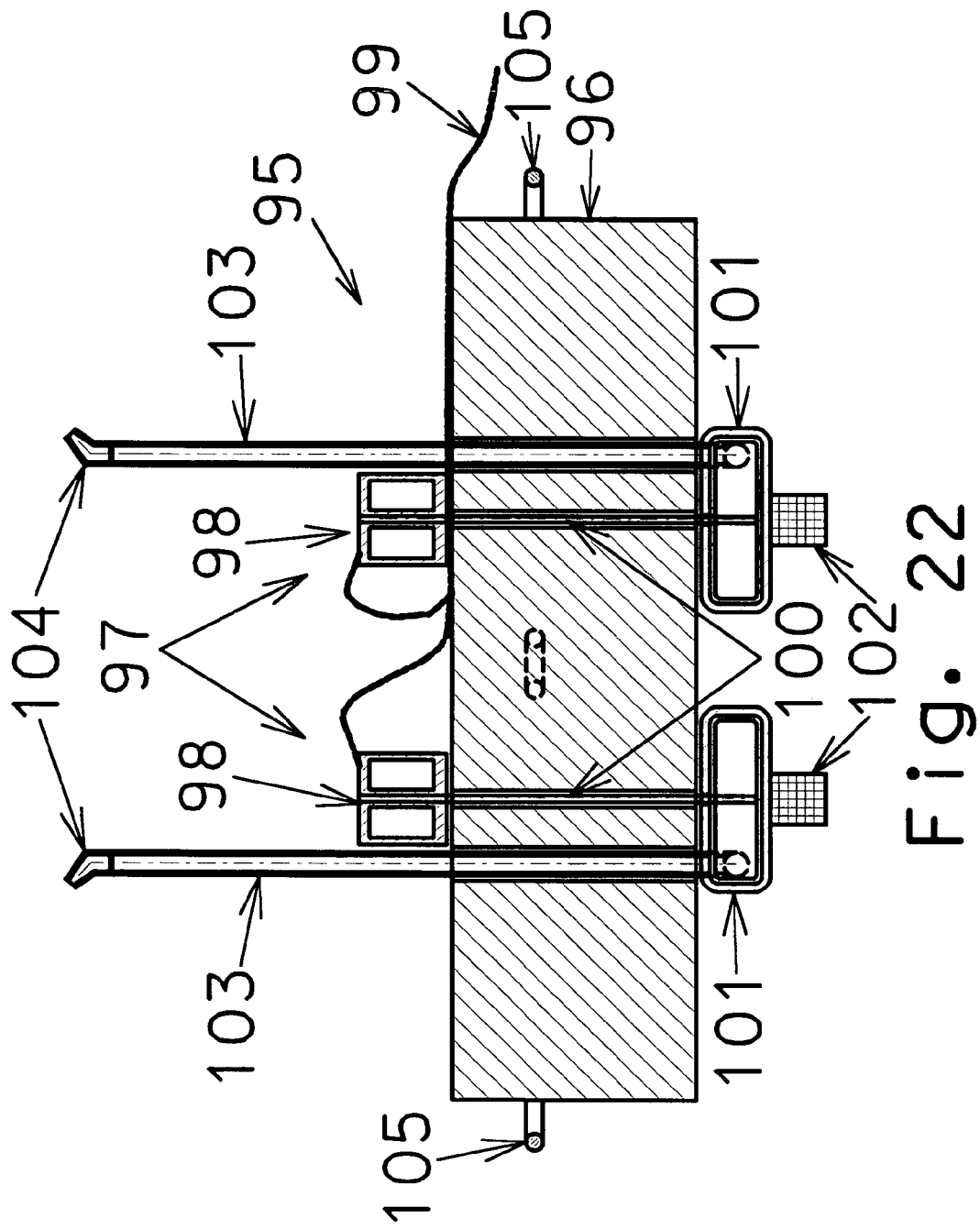
FIG. 22 is a sectional view of a water sprinkling system shown in FIG. 21.

Referring to FIGS. 21 and 22, a variation of the water sprinkler system 95 consists of a floatable platform 96 and two sprinkler units 97. Each of the sprinkler units has a motor 98 and a wire system 99 which supply powers and controls to operate and turn a shaft 100 to drive a pump 101. There is a screen 102 on the suction side of the pump. A pipe 103 connects to the discharge side of the pump. A self-turned sprinkler head 104 is at the other end of the pipe. The platform 96 has many eyes 105. The pumps are mounted on the under side of the platform 96 while the motors are on the topside. The sprinkler heads are above the motors. The two motors turn in opposite directions. One end of the wire system 99 connects to nearby floating generator(s) (not shown) which supply electricity to the motors.

In using this variation of the water sprinkler system, both motors will be turned on. The impellers of the pumps will be turned and water will be sucked up through the screen. The screens will prevent fishes from being sucked into the pumps. The water will be discharged into the pipes then through the sprinkler heads into the air. Because the motors will be turning in different directions, the angular momentum generated by the pumps and motors will be naturalized and the platform will not spin on the water surface. Link rods, which are similar to aforementioned ones and which connect with the eyes 105 can link the water sprinkler system with the vapor collectors and the nearby electricity source so that their relative locations will be the same.

Figure 23:
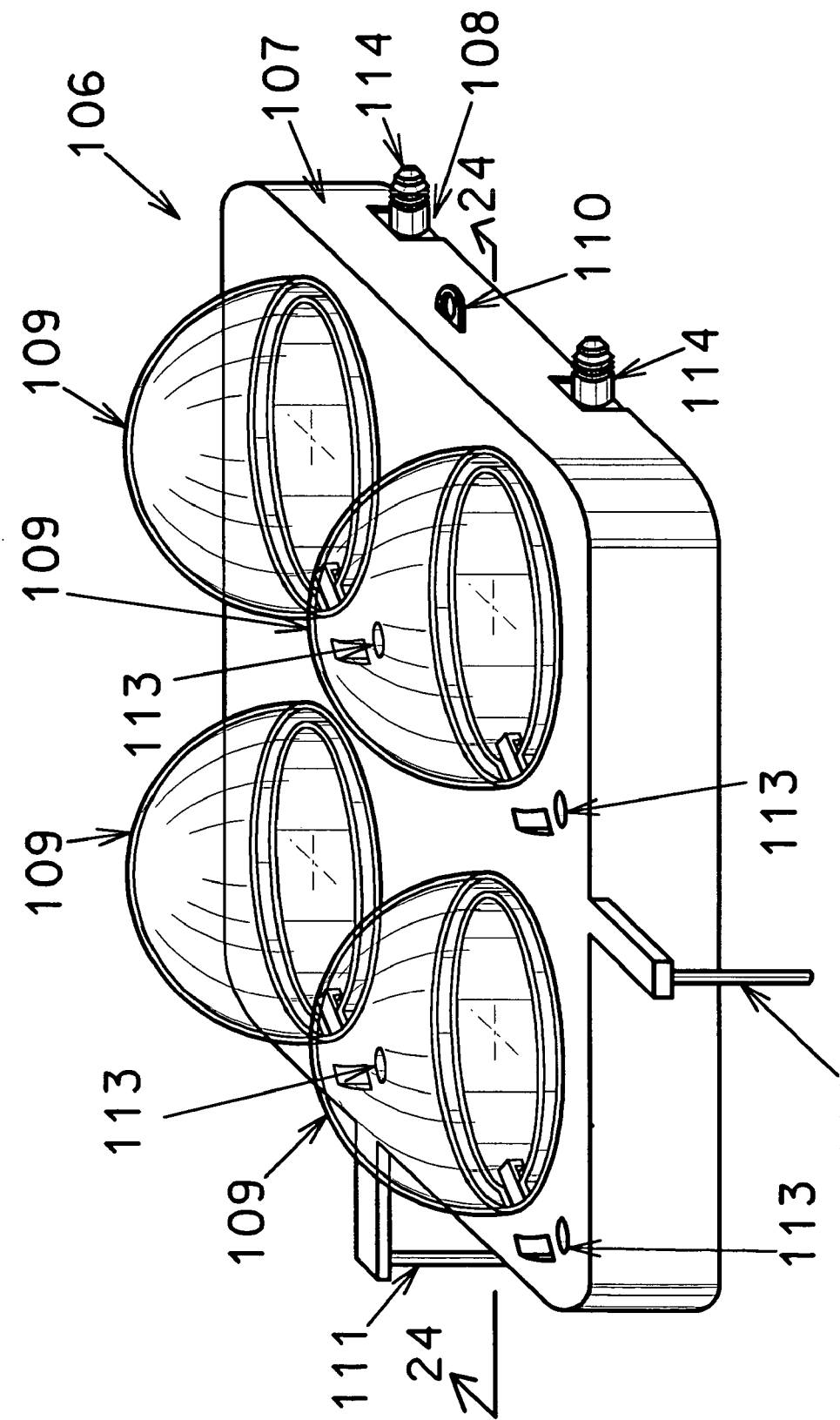
FIG. 23 is an isometric view of a variation of the invented water vapor collector.
Figure 24:
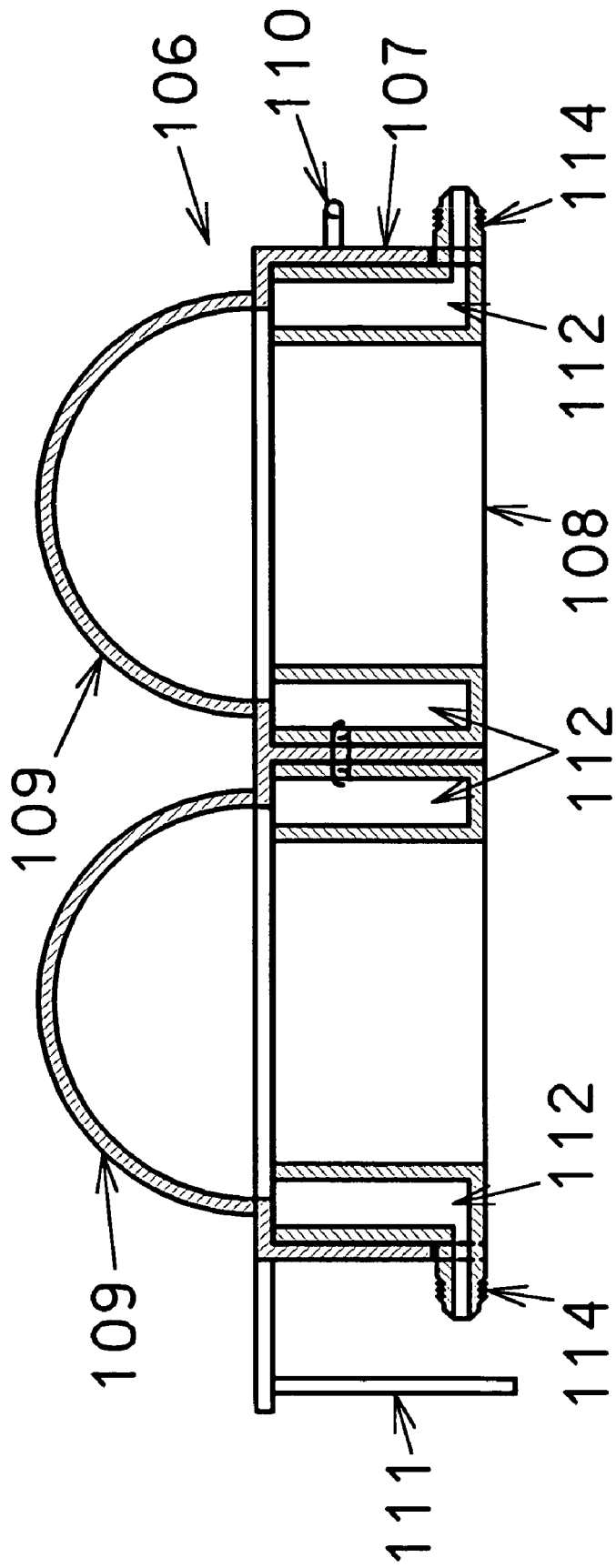
FIG. 24 is a sectional view of the invented device shown in FIG. 23.

In lieu of the aforementioned single-dome and single-nipple device, the invented vapor collector may have multiple domes and multiple nipples. Referring to FIGS. 23 and 24, the same as the single-dome and single-nipple device, the multi-dome and multi-nipple vapor collector 106 also consists of an upper body 107 and a lower body 108. The upper body has many transparent domes 109 that are supported by walls and surfaces. A number of eyes 110 and linking devices 111 are on the exterior surface of the upper body. The lower body 108 has a freshwater collector channel 112 under each dome. The lower body engages with the upper body. The multi-dome and multi-nipple vapor collector also has the vacuum breakers 113 and the nipples 114 these are similar to those of the single-dome and single-nipple device. The uses of this invented device are similar to what are described for the single-dome and single-nipple devices.

The foregoing is considered as illustrative only of the principles of the invention. Furthermore, since numerous modifications and changes will readily occur to those skilled in the art, it is not desired to limit the invention to the exact construction and operation shown and described, and accordingly all suitable modifications and equivalents, may be resorted to, falling within the scope of the invention as claimed.

I claim:

1. A vapor collector, which can be used to collect condensates of water vapors, comprising in combination of
    a) a platform which floats on a water surface and which has a hole;
    b) a roof which spans over said hole;
    c) said roof allowing sun rays to penetrate through;
    d) a channel which is under the edge of said roof;
    e) a nipple which connects to said channel;
    f) said platform having connection means;
    g) said connection means allowing said platform to be connected with other objects;
    h) said platform having at least a vacuum breaker which is a substantially "U"-shaped tube which has a hole at the bottom of the "U" and of which one opening is under said roof but the other opening is not under said roof,
    i) there being a water sprinkling system which can suck up and sprinkle water and which can float on water, and including a platform and a sprinkler unit in dual form,
    j) said sprinkler unit having a pump which has near the suction end a screen, and at the discharge end a piping system which connects with a sprinkler head, said discharge end oriented to discharge sprinkled water onto said roof,
    k) a power system being able to provide power to drive said pump;
    l) said sprinkler unit being mounted on said platform of said sprinkler unit.

2. In combination with the vapor collector of claim 1, a freshwater collector relay, which can transform many relatively small amount inflows into a relatively large amount outflow, that comprises
   a) an enclosed container which can float substantially vertically on water;
   b) said enclosed container having a nipple near the bottom of said enclosed container;
   c) said enclosed container having another nipple in plural form;
   d) said enclosed container having connection means;
   e) said connection means allowing said enclosed container to be connected with other objects;
   f) said connection means, and said another nipple in plural form being near the top of said enclosed container.

3. In combination with the vapor collector of claim 2 of which said enclosed of said freshwater collector relay container has a one-way valve system that allows air to be expelled from said enclosed container but does not allow air to enter said enclosed container.

4. In combination with the vapor collector of claim 3 of which said one-way valve of said freshwater collector relay system comprises of a flap gate which can be opened by the air pressure within said enclosed container.

5. In combination with the vapor collector of claim 1 in which said of said water sprinkling system power system has an internal combustion engine with a power transmitting system which drives said pump and a fuel supply system which can supply, store and control the fuel supply to said internal combustion engine.

6. In combination with the vapor collector of claim 1 in which said of said water sprinkling system power system has a motor which drives said pump and an electricity conducting system which transmits electricity to said motor.

7. A method to collect freshwater from a water surface that comprises of the steps:
   a) providing a freshwater collection system which comprises of a vapor collector field and a freshwater collector;
   said vapor collector field being provided by using conduits, nipples and connection means to join together multiple vapor collectors provided as defined in claim 1, each of said multiple vapor collectors each having at least a roof and being able to
   A) float on said water surface to enclose at least a space;
   B) allow solar rays to penetrate said roof to allow some of the water in said space to become water vapors;
   C) allow said water vapors to become condensates that then move downwards on said roof;
   D) allow said condensates to be collected to form freshwater masses; and
   E) allow said fresh water masses to flow into at least one of said conduits;
   each said freshwater collector being provided by connecting each free end of said conduits used to create said vapor collector field with a nipple of a freshwater collector relay which can transform multiple relatively small amount freshwater inflows into a single relatively large amount freshwater outflow for collection;
   b) putting said freshwater collection system on said water surface; and
   c) collecting said freshwater outflow from said freshwater collector.

8. A method to collect freshwater from a water surface that comprises of the steps;
   a) providing a freshwater collection system which comprises of a vapor collector field, a water sprinkling system and a freshwater collector,
   said vapor collector field being provided by using conduits, nipples and connection means to join together multiple vapor collectors; provided as defined in claim 1, said vapor collector having at least a roof and being able to
   A) float on said water surface to enclose at least a space;
   B) allow solar rays to penetrate said roof to allow some of the water in said space to become water vapors;
   C) allow said water vapors to become condensates that then move downwards on said roof;
   D) allow said condensates to be collected to form freshwater masses; and
   E) allow said freshwater masses to flow into at least one of said conduits;
   each said freshwater collector being created by connecting each free end of said conduits used to create said vapor collector field with a nipple of a freshwater collector relay which can transform multiple relatively small amount freshwater inflows into a single relatively large amount freshwater outflow for collection;
   said water sprinkling system sucking up and sprinkling water on said roof of said vapor collector;
   b) putting said freshwater collection system on said water surface;
   c) turning on said water sprinkler system; and
   d) collecting said freshwater outflow from said freshwater collector.

9. A method as defined in claim 7 in which each said space has a vacuum breaker allowing air to enter said space to prevent excessive vacuum pressure from being developed inside said space.

10. A method as defined in claim 8 in which each said space has a vacuum breaker allowing air to enter said space to prevent excessive vacuum pressure from being developed inside said space.

11. A method as defined in claim 7 in which said freshwater collector relay allows vacuum pressure to be developed when a rate of flow of said single relatively large amount freshwater outflow is larger than a rate of combined flows of said multiple relatively small amount freshwater inflows.

12. A method as defined in claim 8 in which said freshwater collector relay allows vacuum pressure to be developed when a rate of flow of said single relatively large amount freshwater outflow is larger than a rate of combined flows of said multiple relatively small amount freshwater inflows.

13. A method to collect freshwater from a water surface as defined in claim 7 in which said freshwater collection system in multiple form is put on said water surface for use.

14. A method to collect freshwater from a water surface as defined in claim 8 in which said freshwater collection system in multiple form is put on said water surface for use.

15. A freshwater collection system which has a nipple which can be connected with a conduit to export freshwater comprises in combination of
   a) a vapor collector field defined by multiple vapor collectors as defined in claim 1, and a fresh water collector;
   b) said vapor collector field being created by using conduits, tee-nipples and links that join together a multiple vapor collectors as defined in claim 1;
   c) each of said links being a rod which each end engages with said connection means of said vapor collector of claim 1;
   d) a conduit end joining with said nipple of said vapor collector of claim 1;
   e) conduit ends joining with said tee-nipples; and wherein f) after the creation of said vapor collector field, said freshwater collector is created by connecting each free end of said conduits with said another nipple in plural form of a freshwater collector relay;

g) said freshwater collector being connected with said vapor collector field by links each of which is a rod of which one end engages with said connection means of said vapor collector of claim 1 and of which the other rod end engages with said connection means of said freshwater collector relay;

h) said nipple connected with a conduit to export freshwater and being said nipple of said freshwater collector relay.

16. A freshwater collection system which has a nipple which can be connected with a conduit to export freshwater comprises in combination of a) a vapor collector field defined by multiple vapor collectors as defined in claim 1, a water sprinkling system and a freshwater collector;

b) said vapor collector field being created by using conduits, tee-nipples and links that join together a multiple vapor collectors as defined in claim 1;

c) each of said links being a rod of which each end engages with said connection means of said vapor collector of claim 1;

d) a conduit end joining with said nipple of said vapor collector of claim 1;

e) conduit ends joining with said tee-nipples;

f) and wherein after the creation of said vapor collector field, said freshwater collector is created by connecting each free end of said conduits with said another nipple in plural form of a said freshwater collector relay;

g) said freshwater collector being connected with said vapor collector field by links each of which being a rod of which one end engages with said connection means of said vapor collector of claim 1 and of which the other end engages with said connection means of said freshwater collector relay;

h) said nipple connected with a conduit to export freshwater and being said nipple of said freshwater collector relay;

i) said water sprinkling system operating to sprinkle water on said roof;

j) said water sprinkling system being connected with said vapor collector field by links each of which is a rod of which one end engages with said connection means of said vapor collector of claim 1 and of which the other end engages with said connection means of said water sprinkling system.

17. In combination with a vapor collector as defined in claim 1, a freshwater collection system which has a nipple connected with a conduit to export freshwater, that comprises in combination of a) a field of said vapor collectors of claim 1 and a freshwater collector;

b) said vapor collector field including conduits, tee-nipples and links that join together said vapor collectors;

c) each of said links being a rod of which each end engages with said connection means of a said vapor collector;

d) a conduit end joining with a nipple of said vapor collector;

e) another conduit end joining with a nipple of said vapor collector;

f) said freshwater collector characterized as being connected with a free end of one of said conduits;

g) said freshwater collector being connected with said vapor collector field by links each of which is a rod having ends of which one end engages with said connection means of said vapor collector and another end engages with said connection means of said freshwater collector.

18. A vapor collector, which can be used to collect condensates of water vapors, comprising in combination:

a) a platform which floats on a water surface and which has multiple holes;

b) each of said multiple holes having an associated roof;

c) said roof allowing sun rays to penetrate therethrough;

d) a channel which is under the edge of said roof;

e) a nipple which connects to said channel;

f) said platform having connection means;

g) said connection means allowing said platform to be connected with other objects;

h) certain of said multiple holes of said platform having at least an associated vacuum breaker which is a substantially "U"-shaped tube which has a hole at the bottom of the "U" and wherein one opening is under said roof but another opening is not under said roof.

19. A vapor collector of claim 18 of which there is at least one hole that has no said associated vacuum breaker.

20. A freshwater collection system which has a nipple connected with a conduit to export comprises in combination of a) a vapor collector field of said vapor collectors of claim 1, a water sprinkling system and a freshwater collector;

b) said vapor collector field including conduits, tee-nipples and links that join together said vapor collectors;

c) each of said links being a rod of which each end engages with a connection means;

d) an end of said conduits joining with said nipple of said vapor collector;

e) each conduit joining with a said tee-nipple;

f) said freshwater collector characterized as being connected with a conduit free end, g) said freshwater collector being connected with said vapor collector field by links each of which is a rod having ends of which one end engages with said connection means of said vapor collector and another end engages with said connection means of said freshwater collector h) and a water sprinkling system connected with said vapor collector field by links each of which is a rod of which one end engages with said connection means of said vapor collector and of which another end engages with said connection means.

* * * * *